United States Patent
Chon et al.

(10) Patent No.: US 9,994,931 B2
(45) Date of Patent: Jun. 12, 2018

(54) METHOD FOR EXTRACTING LITHIUM FROM SOLUTION CONTAINING LITHIUM

(71) Applicants: POSCO, Pohang-si (KR); RESEARCH INSTITUTE OF INDUSTRIAL SCIENCE & TECHNOLOGY, Pohang-si (KR)

(72) Inventors: Uong Chon, Pohang-si (KR); Gi-Chun Han, Cheongju-si (KR); Ki Young Kim, Pohang-si (KR); So Ra Jung, Pohang-si (KR); Kee Uek Jeung, Pohang-si (KR); Chang Ho Song, Incheon (KR); Young Seok Jang, Pohang-si (KR)

(73) Assignees: POSCO, Pohang-si (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 592 days.

(21) Appl. No.: 14/418,132

(22) PCT Filed: Dec. 28, 2012

(86) PCT No.: PCT/KR2012/011709
§ 371 (c)(1),
(2) Date: Jan. 29, 2015

(87) PCT Pub. No.: WO2014/021523
PCT Pub. Date: Feb. 6, 2014

(65) Prior Publication Data
US 2015/0197830 A1 Jul. 16, 2015

(30) Foreign Application Priority Data
Jul. 31, 2012 (KR) .......................... 10-2012-0084196

(51) Int. Cl.
*C22B 26/12* (2006.01)
*C22B 3/42* (2006.01)
*C22B 7/00* (2006.01)

(52) U.S. Cl.
CPC ................ *C22B 26/12* (2013.01); *C22B 3/42* (2013.01); *C22B 7/006* (2013.01); *Y02P 10/234* (2015.11)

(58) Field of Classification Search
None
See application file for complete search history.

(56) References Cited

U.S. PATENT DOCUMENTS

| 7,157,065 B2 | 1/2007 | Boryta et al. |
| 2012/0103826 A1 | 5/2012 | Gordon et al. |

FOREIGN PATENT DOCUMENTS

| CL | 43676 | 6/2002 |
| CL | 47766 | 6/2011 |

(Continued)

OTHER PUBLICATIONS

Koch Membrane Systems, "Fluid Systems(R) TFC(R)-SR (TM) 100 8" Element", www.kochmembrane.com, Feb. 2012.

*Primary Examiner* — Melissa S Swain
(74) *Attorney, Agent, or Firm* — The Webb Law Firm

(57) ABSTRACT

Disclosed is a method of extracting lithium from a solution including lithium. The method of extracting lithium from a solution including lithium includes: separating the solution including lithium into a monovalent ion-containing solution and a solution including ions having more than divalence using a separation membrane having a negative charge on its surface; removing impurities from the monovalent ion-containing solution; and precipitating lithium dissolved in the monovalent ion-containing solution into lithium phos- (Continued)

phate by adding a phosphorus-supplying material to the monovalent ion-containing solution.

17 Claims, 14 Drawing Sheets

(56) References Cited

FOREIGN PATENT DOCUMENTS

| | | | |
|---|---|---|---|
| CN | 1542147 | A | 11/2004 |
| CN | 102036739 | A | 4/2011 |
| CN | 102433434 | A | 5/2012 |
| JP | 2008-066019 | | 3/2008 |
| JP | 2008066019 | A | 3/2008 |
| JP | 2011-168461 | | 9/2011 |
| JP | 2011168461 | A | 9/2011 |
| KR | 1020030006744 | A | 1/2003 |
| KR | 1020050021856 | A | 3/2005 |
| KR | 1020120005980 | A | 1/2012 |
| KR | 1020120015658 | A | 2/2012 |
| KR | 1020120015659 | A | 2/2012 |
| KR | 20120021675 | A | 3/2012 |
| KR | 1020120021675 | A | 3/2012 |
| KR | 1020120063068 | A | 6/2012 |
| KR | 1020120063424 | A | 6/2012 |
| KR | 1020130081156 | A | 7/2013 |
| KR | 1020110036772 | | 4/2014 |
| WO | 98/59385 | A1 | 12/1998 |
| WO | 2012005545 | A2 | 1/2012 |

【Figure 1】
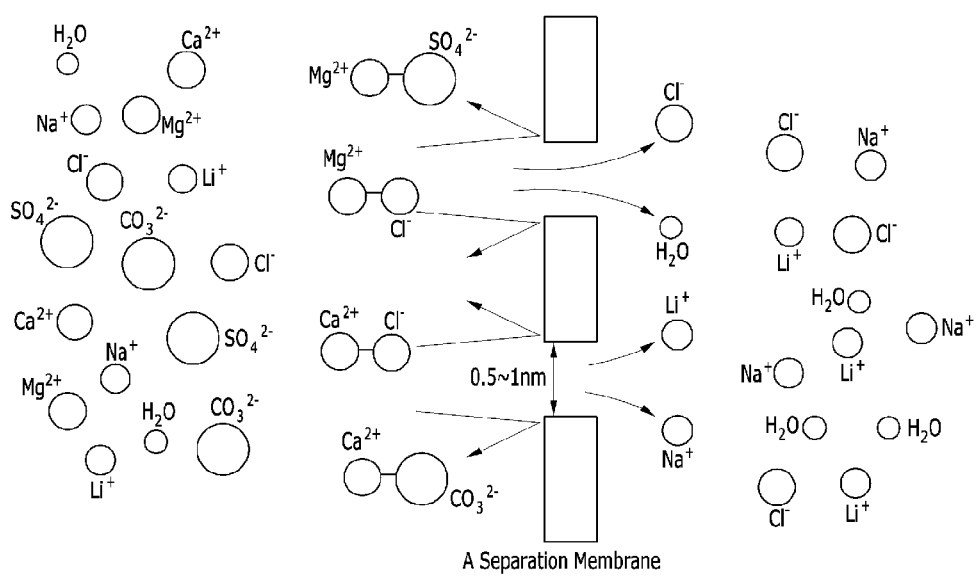
A Separation Membrane

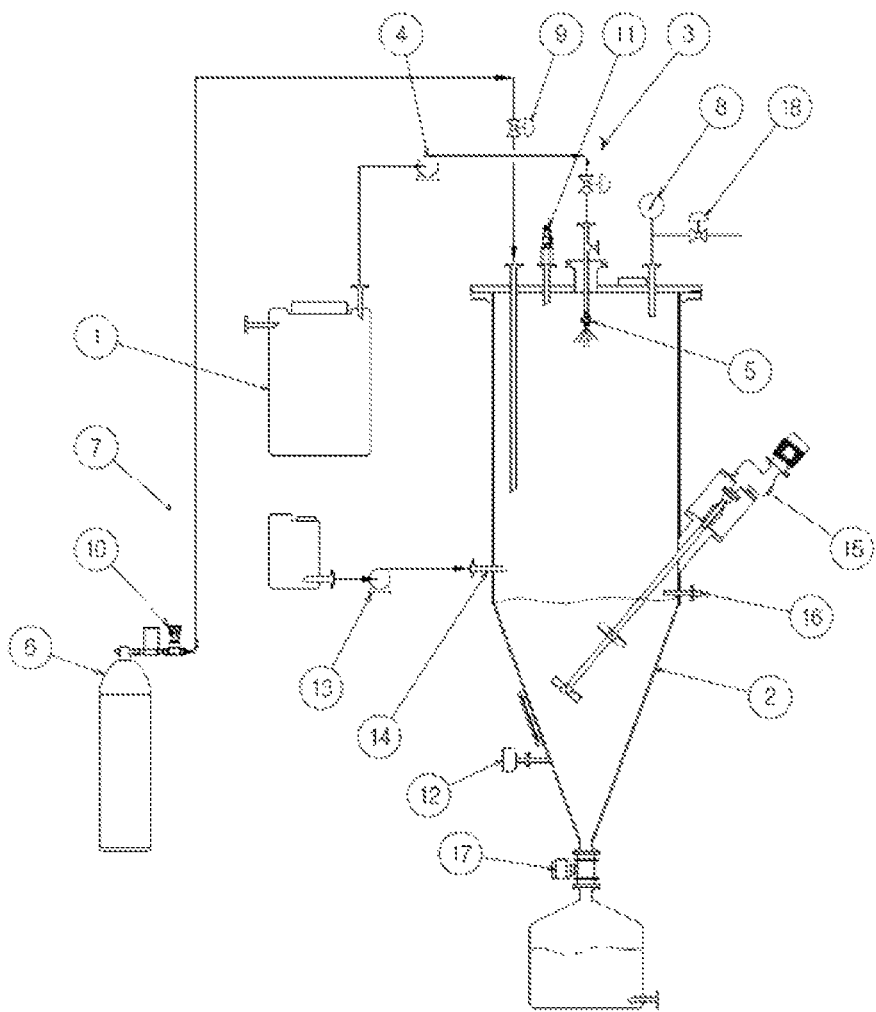
【Figure 2】

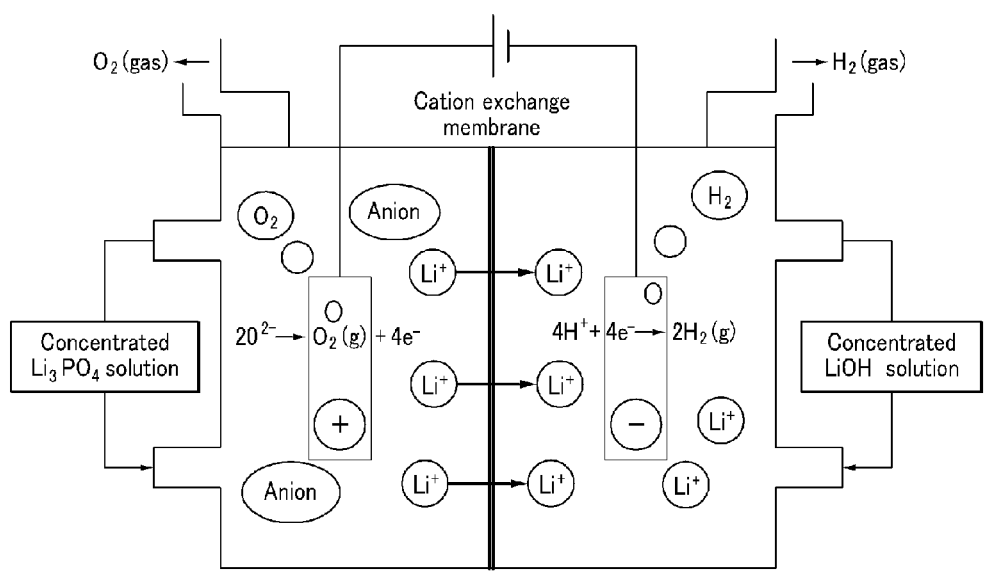
[Figure 3]

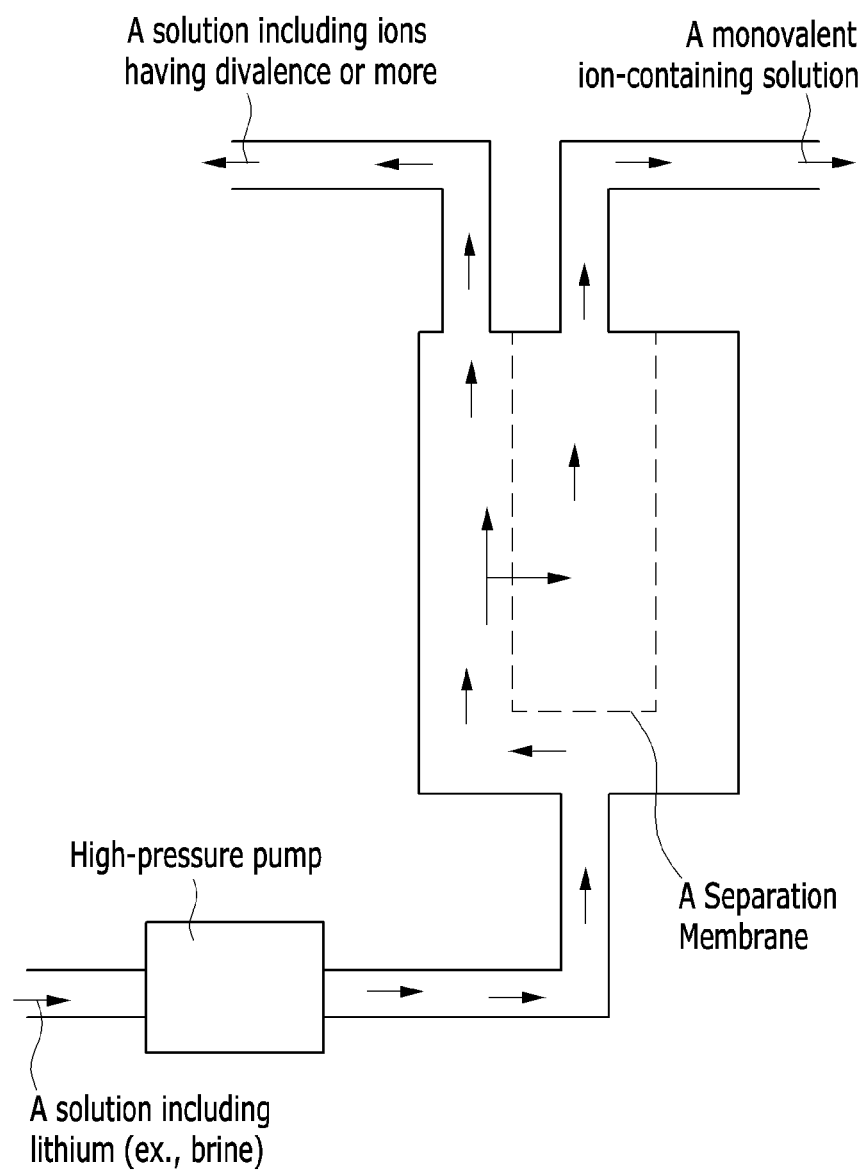

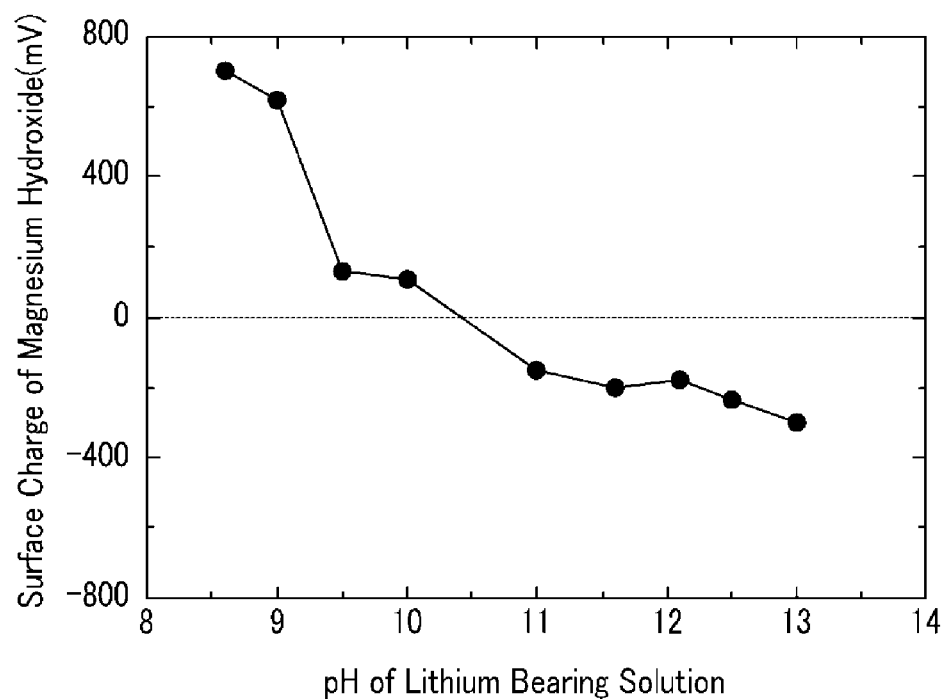
【Figure 5】

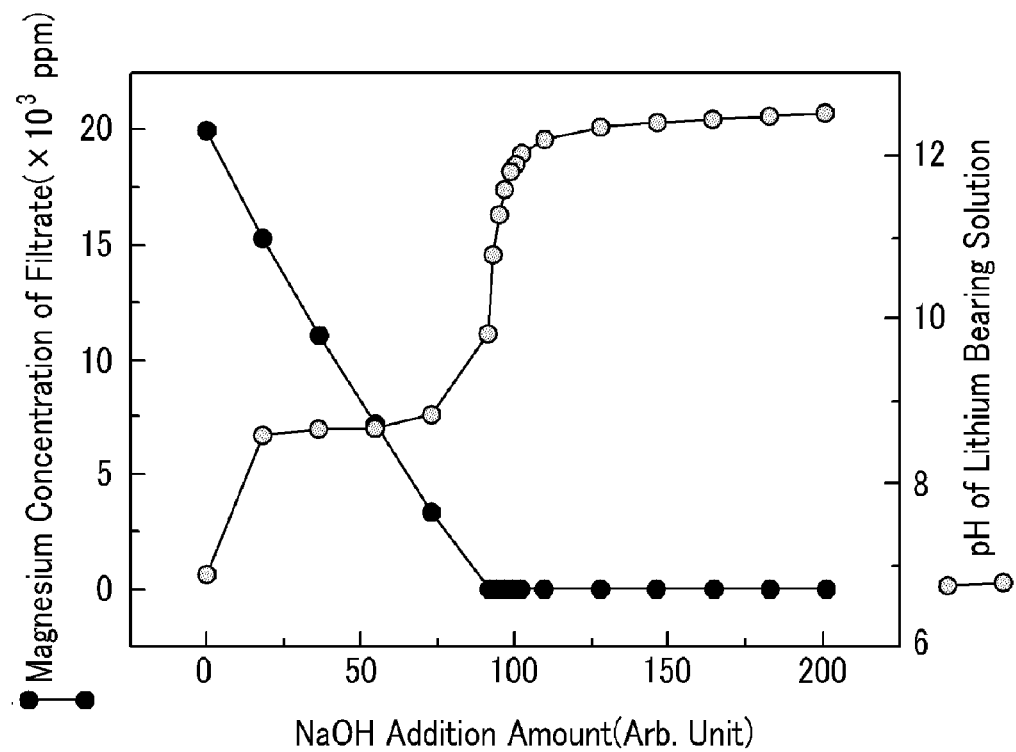
[Figure 6]

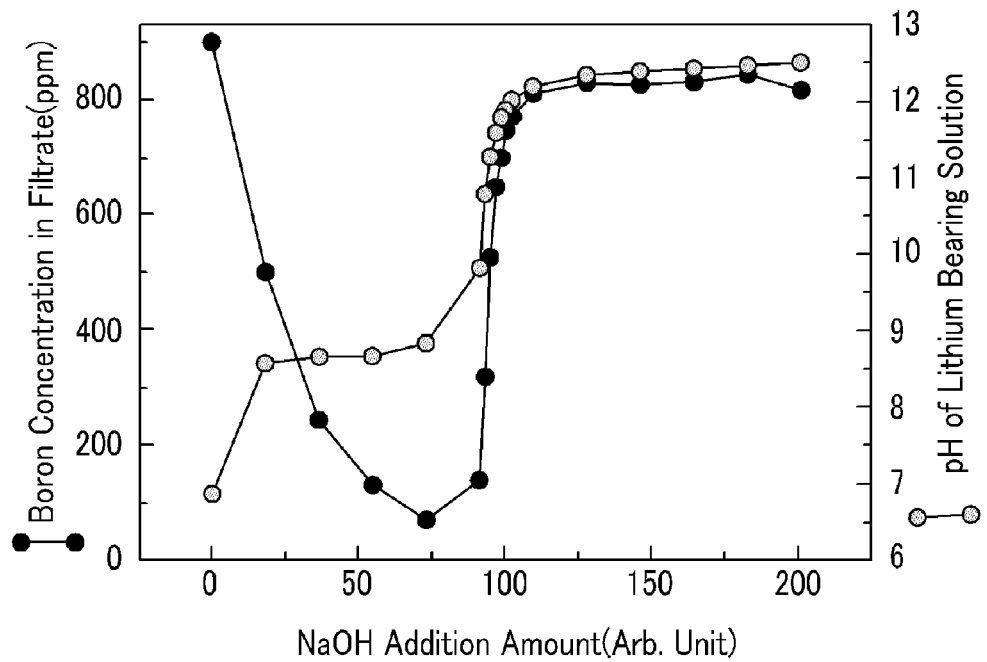
[Figure 7]

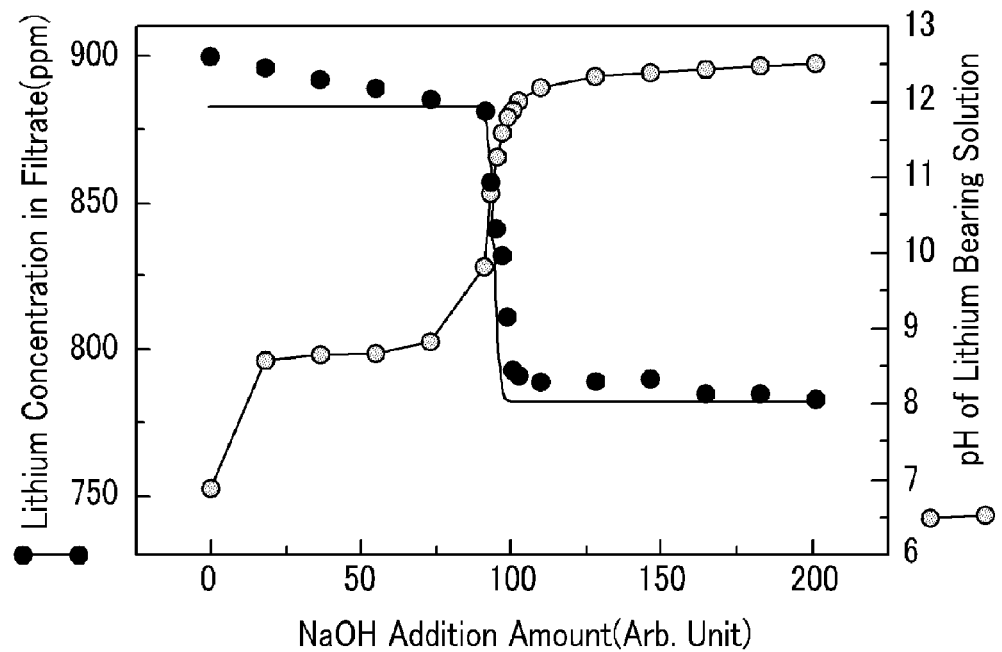
[Figure 8]

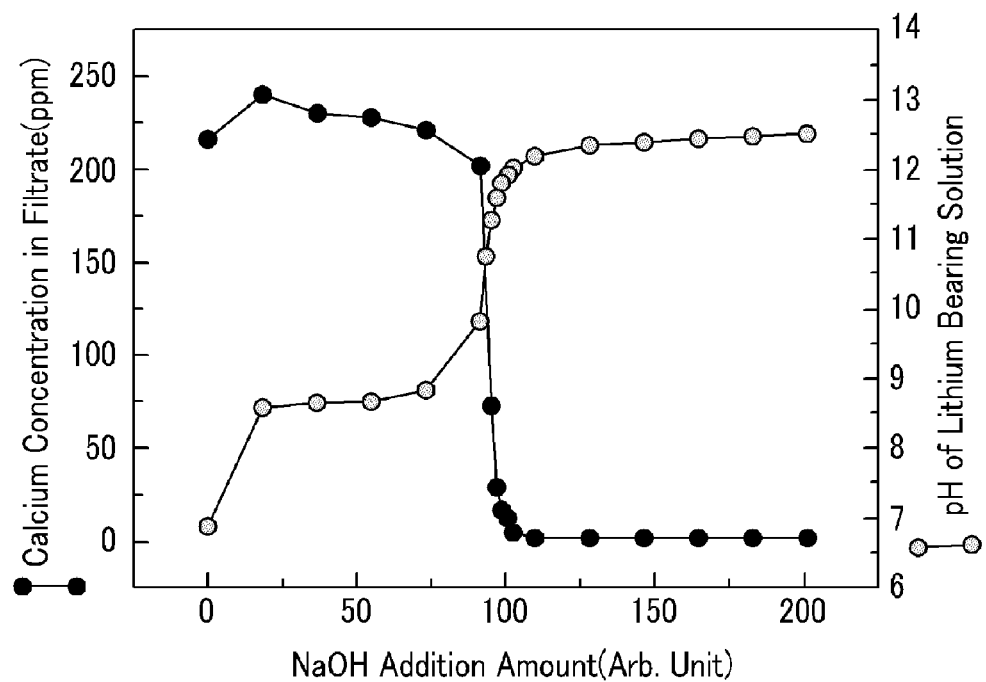
[Figure 9]

[Figure 10]
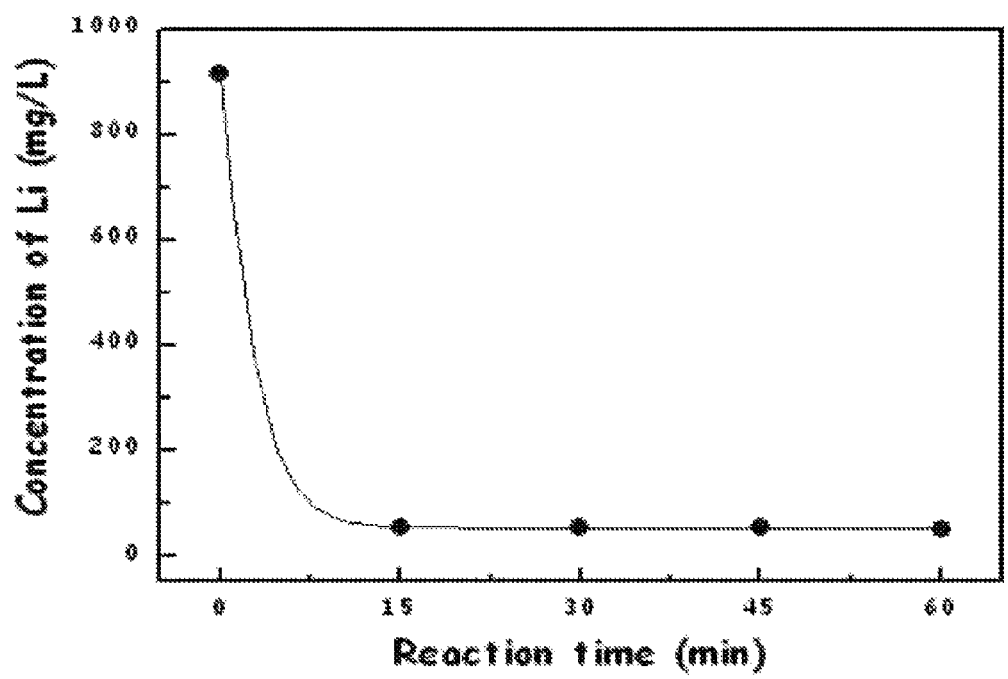

[Figure 11]
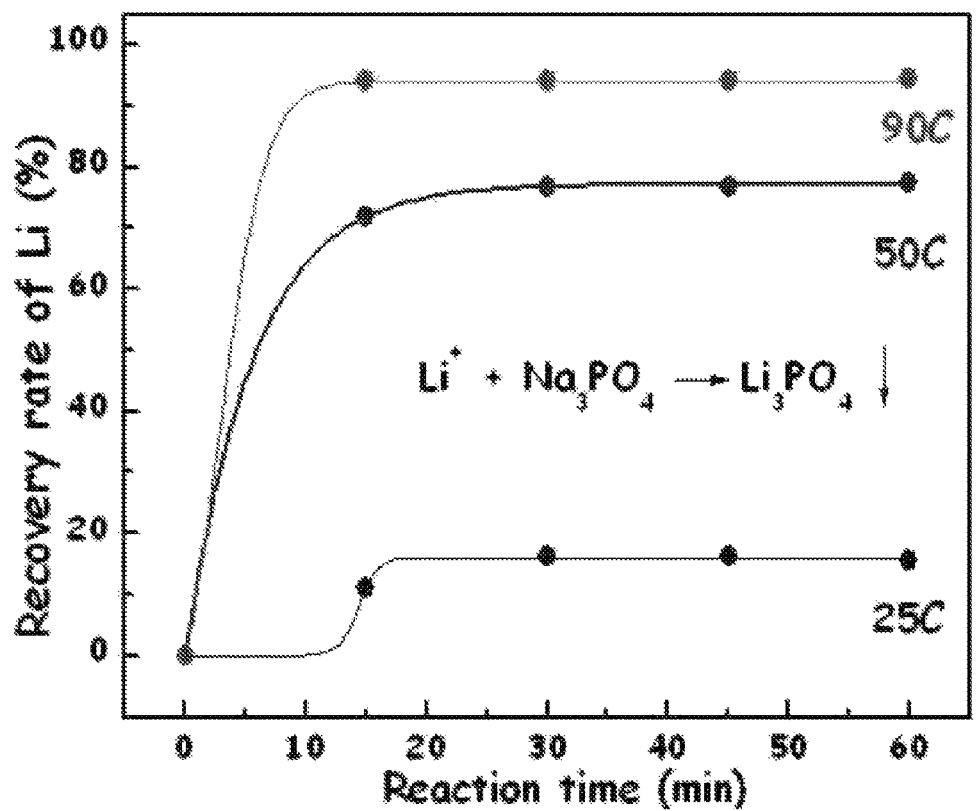

【Figure 12】
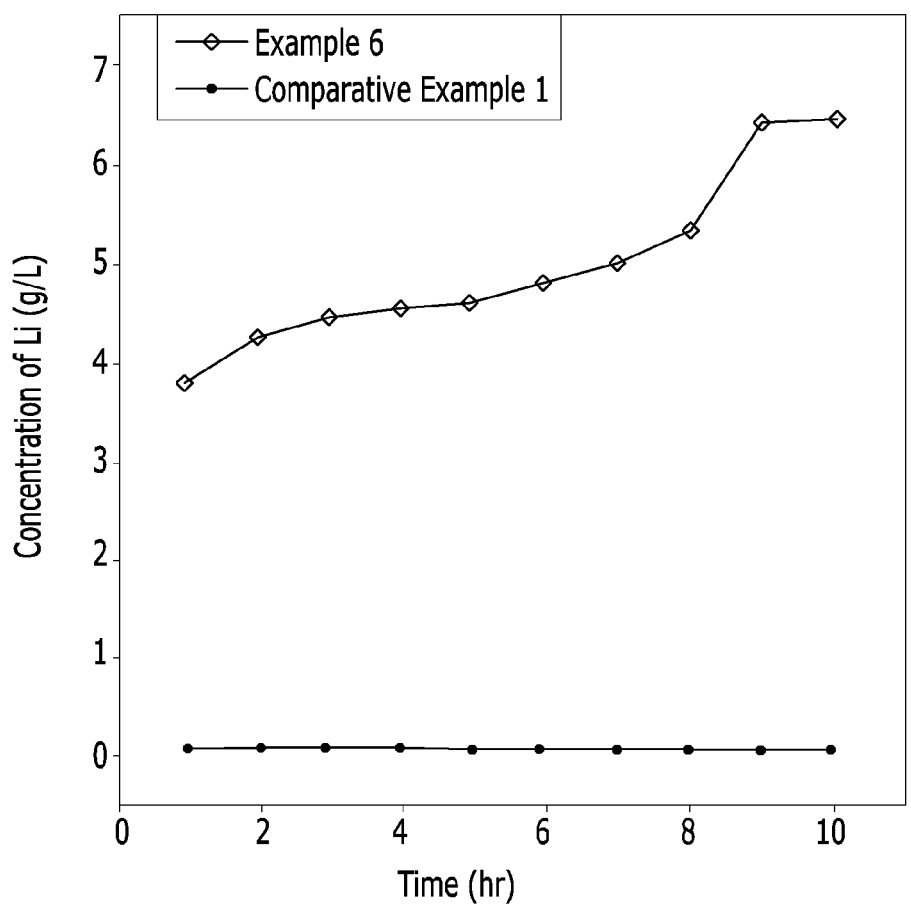

[Figure 13]
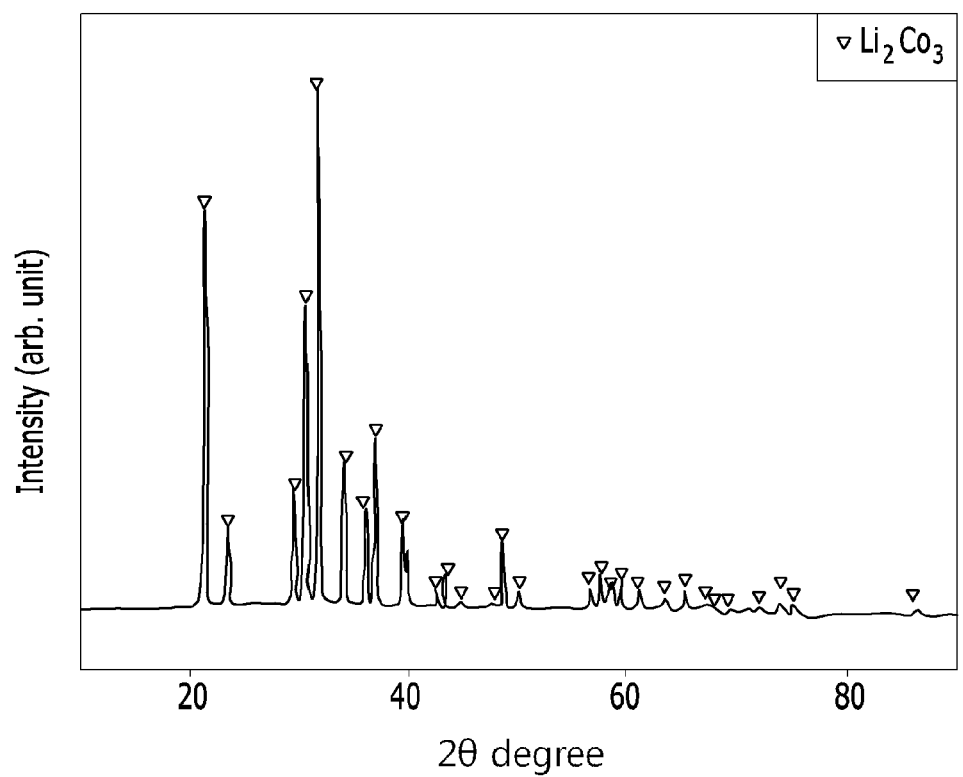

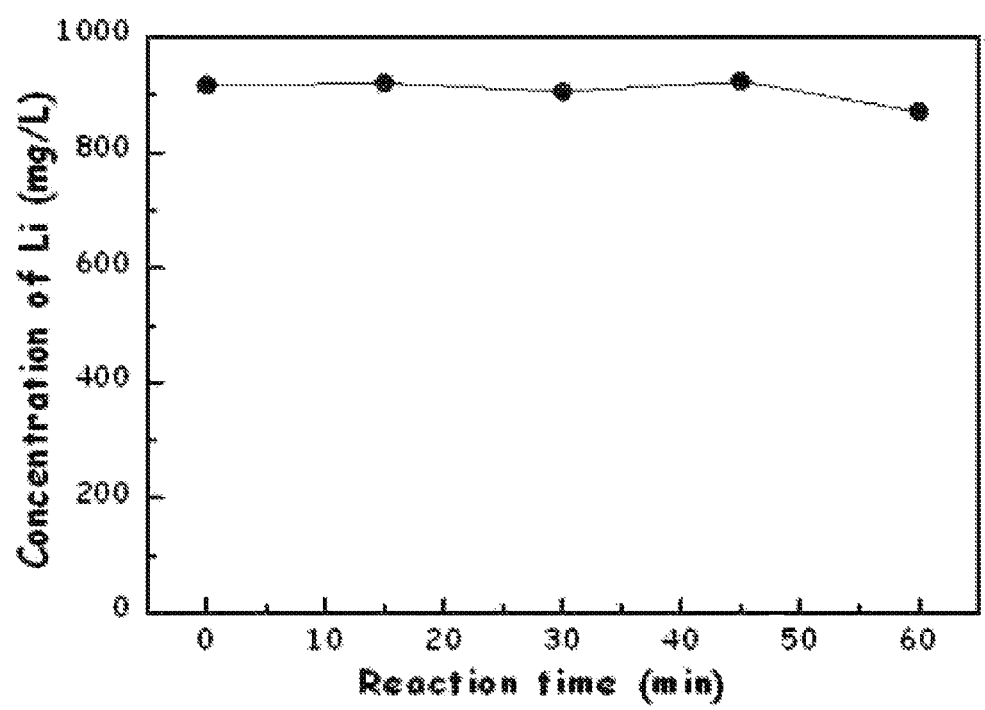
[Figure 14]

METHOD FOR EXTRACTING LITHIUM FROM SOLUTION CONTAINING LITHIUM

CROSS-REFERENCE TO RELATED APPLICATIONS

This application is the United States national phase of International Application No. PCT/KR2012/011709 filed Dec. 28, 2012, and claims priority to Korean Patent Application No. 10-2012-0084196 filed Jul. 31, 2012, the disclosures of which are hereby incorporated in their entirety by reference.

TECHNICAL FIELD

A method of extracting lithium from a solution including lithium is disclosed.

BACKGROUND ART

Currently, lithium is being diversely applied to various industries such as for rechargeable batteries, glass, ceramics, alloys, lubricants, pharmaceuticals, and the like. In particular, the rechargeable lithium battery has recently been receiving attention as a main power source for hybrid and electric vehicles. Furthermore, the market for conventional compact batteries for cell phones, notebook computers, and the like is expected to continually grow to approximately one-hundred times larger than its current size.

In addition, lithium has been increasingly applied to electrical, chemical, and energy fields as well as to hybrid and electric vehicle industries due to a global movement towards more stringent environmental regulations. Thus, domestic and foreign demand for lithium is expected to be dramatically increased.

The lithium may be obtained from a mineral, brine, seawater, and the like as a main source. Although mineral sources such as spodumene, petalite, and lepidolite contain lithium in a relatively large amount ranging from approximately 1 to 1.5%, the lithium is extracted through a complicated process such as floatation, calcination at a high temperature, grinding, acid mixing, extraction, purification, concentration, precipitation, and the like. These processes are prohibitively expensive because of high energy consumption, and also cause severe environmental pollution due to the use of acids during the lithium extraction.

In addition, approximately $2.5 \times 10^{11}$ tons of lithium are reported to be dissolved in seawater, and may be extracted by inserting an extraction device containing an absorbent into the seawater to selectively absorb the lithium and treating the absorbed lithium with acids. However, since the lithium is contained at a concentration of only 0.17 ppm in seawater, this direct extraction of lithium from the seawater is extremely inefficient and uneconomical.

Due to the aforementioned disadvantages, lithium is currently extracted from brine produced from natural salt lakes, but salts such as Mg, Ca, B, Na, K, $SO_4$, and the like as well as the lithium are dissolved in the brine.

Furthermore, the lithium is contained in the brine in a concentration ranging from approximately 0.3 to 1.5 g/L and is usually extracted in a form of lithium carbonate having solubility of about 13 g/L. Even if the lithium contained in the brine is completely converted to lithium carbonate, the lithium carbonate is contained in a concentration of 1.59 to 7.95 g/L in the brine (since $Li_2CO_3$ has a molecular weight of 74 and Li has an atomic weight of 7, the concentration of the lithium carbonate may be estimated by multiplying the concentration of the lithium by 5.3 (74÷14≈5.3)). However, since the concentration of the lithium carbonate is mostly lower than its solubility, the extracted lithium carbonate is re-dissolved in the brine and thus has an extremely low lithium recovery rate.

Conventionally, lithium has been extracted into lithium carbonate from brine by pumping the brine from a natural salt lake, storing it in an evaporation pond, and then naturally evaporating it outdoors over a long period of time, for instance, for several months to about one year, to concentrate the lithium by several tenfold. Then, the lithium carbonate can be retrieved in an amount greater than or equal to its solubility after precipitating and removing the impurities such as magnesium, calcium, boron, and the like therefrom.

For instance, Chinese Patent Pub. No. 1,626,443 describes a method of extracting lithium using brine containing concentrated lithium with a low amount of magnesium by evaporating and concentrating the brine under solar heat and repeatedly electro-dialyzing it.

However, such a conventional method requires much time for evaporation and concentration of the brine and thus is unproductive, especially during rainy seasons. Further, loss of lithium is unavoidable when the lithium is extracted along with other impurities in the form of a salt.

One embodiment of the present invention provides an environmentally-friendly method of extracting lithium from a solution including lithium, which is capable of extracting a useful resource with high purity from a solution including lithium (e.g., brine) with a low cost within a short term and minimizing generation of a material harmful to the environment and a human body.

SUMMARY OF THE INVENTION

In one embodiment of the present invention, a method of extracting lithium from a solution including lithium is provided, including: separating the solution including lithium into a monovalent ion-containing solution and another solution including ions having divalence or more using a separation membrane having a negative charge on its surface; removing impurities from the monovalent ion-containing solution and then adding a phosphorus-supplying material to the monovalent ion-containing solution after removing the impurities; and precipitating the lithium dissolved therein into lithium phosphate.

The separation membrane having a negative charge on its surface may have a pore size ranging from 0.5 to 1 nm.

The separation membrane having a negative charge on its surface may have a thickness ranging from 0.5 to 1.5 μm.

The separation membrane having a negative charge on its surface may have a sulfone group on the surface.

In the process of removing impurities from the monovalent ion-containing solution, the impurities may be non-separated divalent ions in the process of separating a solution including lithium into a monovalent ion-containing solution and another solution including ions having divalence or more using a separation membrane having a negative charge on its surface.

In the process of removing impurities from the monovalent ion-containing solution, the impurities may include magnesium, boron, or calcium.

The solution including lithium may be brine.

The method may further include extracting sodium chloride by naturally evaporating the monovalent ion-containing solution after the process of removing impurities from the monovalent ion-containing solution.

The method may further include naturally evaporating the monovalent ion-containing solution from which impurities are removed after the process of removing impurities from the monovalent ion-containing solution.

The process of removing impurities from the monovalent ion-containing solution may be a process of precipitating and removing impurities including magnesium, boron, or calcium included in the monovalent ion-containing solution by adding hydroxide anions to the monovalent ion-containing solution.

The process of removing impurities from the monovalent ion-containing solution may include adding hydroxide anions to the monovalent ion-containing solution, and then producing magnesium hydroxide from the magnesium, maintaining pH of a filtered solution obtained after removing the magnesium in a range of greater than or equal to 12, and then precipitating calcium.

The process of removing impurities from the monovalent ion-containing solution may include: adding hydroxide anions to the monovalent ion-containing solution and then producing magnesium hydroxide from the magnesium; adsorbing boron on the magnesium hydroxide, co-precipitating the magnesium and the boron, and recovering the co-precipitated magnesium and boron; and maintaining pH of a filtered solution obtained after removing the magnesium and boron in a range of greater than or equal to 12, and then precipitating calcium.

The process of adding hydroxide anions to the monovalent ion-containing solution and then producing magnesium hydroxide from the magnesium is a process of adding hydroxide anions to the monovalent ion-containing solution and producing magnesium hydroxide from the magnesium while pH of the monovalent ion-containing solution is maintained in a range of 8.5 to 10.5. The process of adsorbing boron on the magnesium hydroxide, co-precipitating the magnesium and boron, and recovering the co-precipitated magnesium and boron is a process of adsorbing boron in a monovalent ion-containing solution having pH of 8.5 to 10.5 and including the magnesium hydroxide, on the magnesium hydroxide, co-precipitating the magnesium and boron, and then recovering the co-precipitated magnesium and boron. The process of adding hydroxide anions to the monovalent ion-containing solution and producing magnesium hydroxide from the magnesium, while pH of the monovalent ion-containing solution is maintained in a range of 8.5 to 10.5, and the process of adsorbing boron in a monovalent ion-containing solution having the pH of 8.5 to 10.5 and including the magnesium hydroxide, on the magnesium hydroxide, co-precipitating the magnesium and boron, and then recovering the co-precipitated magnesium and boron, may be performed simultaneously.

The process of removing impurities from the monovalent ion-containing solution may be a process of reacting calcium in the monovalent ion-containing solution with a carbonation gas and removing the calcium in a form of a calcium carbonate salt.

The process of reacting calcium in the monovalent ion-containing solution with a carbonation gas and removing the calcium in a form of a calcium carbonate salt may be performed at pH 5 to 8.5.

The method may further include reacting magnesium in the monovalent ion-containing solution with a carbonation gas to remove the magnesium in a form of a magnesium carbonate salt after the process of reacting calcium in the monovalent ion-containing solution with a carbonation gas and removing the calcium in a form of a calcium carbonate salt.

The process of reacting magnesium in the monovalent ion-containing solution with a carbonation gas to remove the magnesium in a form of a magnesium carbonate salt may be performed at pH 5 to 12.

The process of reacting calcium in the monovalent ion-containing solution with a carbonation gas to separate the calcium in a form of a calcium carbonate salt, or the process of reacting magnesium in the monovalent ion-containing solution with a carbonation gas to remove the magnesium in a form of a magnesium carbonate salt, may include a process of spraying brine into a carbonation reaction tank through a droplet spray unit in the carbonation reaction tank charged with a carbonation gas at a predetermined pressure in a form of droplets.

The carbonation reaction tank may be further equipped with an alkali solution-supplying unit to control pH.

The process of adding a phosphorus-supplying material to the monovalent ion-containing solution from which impurities are removed and precipitating lithium dissolved therein into lithium phosphate may include: adding nucleus particles to the monovalent ion-containing solution from which impurities are removed; and adding a phosphorus-supplying material to the monovalent ion-containing solution including the nucleus particles and then precipitating lithium dissolved therein into lithium phosphate.

The nucleus particles may have a particle diameter of less than or equal to 100 μm.

The nucleus particles may have a particle diameter of less than or equal to 1 μm.

The nucleus particles may be a lithium compound.

The nucleus particles added to the solution including lithium may be added in an amount of less than or equal to 0.05 g/L relative to the solution including lithium.

The nucleus particles may be $Li_3PO_4$, $Li_2CO_3$, $Li_2SO_4$, or a combination thereof.

The phosphorus-supplying material may be at least one selected from phosphorus, phosphoric acid, and a phosphate salt.

In the process of adding a phosphorus-supplying material to the monovalent ion-containing solution from which impurities are removed and then precipitating lithium dissolved therein into lithium phosphate, the monovalent ion-containing solution may have a lithium concentration of greater than or equal to 0.1 g/L.

The method may further include filtering the precipitated lithium phosphate from the monovalent ion-containing solution to extract lithium phosphate.

The method may further include electrolyzing the extracted lithium phosphate to obtain lithium hydroxide.

The process of electrolyzing the extracted lithium phosphate to obtain lithium hydroxide may be performed using an electrolysis device including anode and cathode cells partitioned by a cation exchange membrane.

In the electrolysis device, a lithium phosphate aqueous solution is added to the anode cell of the electrolysis device, while de-ionized water is added to the cathode cell of the electrolysis device.

In addition, the method may further include forming lithium carbonate by reacting the obtained lithium hydroxide with a carbonation gas or a carbonate-containing material.

Then, a lithium hydroxide aqueous solution may be obtained by: preparing a lithium phosphate aqueous solution including the precipitated lithium phosphate particles; adding a phosphoric acid anion precipitation agent to the lithium phosphate aqueous solution; and reacting cations of the phosphoric acid anion precipitation agent with phosphoric acid anions of the lithium phosphate to precipitate a sparingly-soluble phosphoric acid compound.

The sparingly-soluble phosphoric acid compound may have lower solubility for water than that of the lithium phosphate.

The phosphoric acid anion precipitation agent may be an oxide or hydroxide.

The cations of the phosphoric acid anion precipitation agent may be an alkaline earth metal.

The cations of the phosphoric acid anion precipitation agent may be cations of calcium, strontium, barium, radium, beryllium, magnesium, or a combination thereof.

The phosphoric acid anion precipitation agent may be calcium hydroxide.

The sparingly-soluble phosphoric acid compound may be hydroxyapatite.

The lithium phosphate particles in the lithium phosphate aqueous solution may have a particle diameter ranging from 0.01 μm to 40 μm.

The lithium phosphate particles in the lithium phosphate aqueous solution may have a surface area ranging from 1.0 $m^2/g$ to 100 $m^2/g$.

The phosphoric acid anion precipitation agent may be added in an amount of greater than or equal to 1 equivalent relative to the lithium phosphate in the lithium phosphate aqueous solution.

The lithium phosphate in the lithium phosphate aqueous solution including the lithium phosphate particles may have a concentration of greater than or equal to 0.01%.

The method may further include separating the precipitated sparingly-soluble phosphoric acid compound from the lithium hydroxide aqueous solution.

The method may further include concentrating the separated lithium hydroxide aqueous solution using reverse osmosis.

The concentrated lithium hydroxide aqueous solution may have a concentration of greater than or equal to 9000 ppm.

The method may include reacting the separated lithium hydroxide aqueous solution with a carbonation gas or a carbonate-containing material to obtain lithium carbonate.

The method may further include extracting borax from the monovalent ion-containing solution including the precipitated lithium phosphate.

The method may further include adding an anion surfactant to the borax-extracted monovalent ion-containing solution to extract a potassium compound.

Accordingly, the present invention provides a method of extracting a useful resource from a solution including lithium (e.g., brine) with a low cost over a short term and minimizing generation of a material harmful to the environment and a human body.

BRIEF DESCRIPTION OF THE DRAWINGS

FIG. 1 schematically shows operation of a separation membrane according to one embodiment of the present invention.

FIG. 2 is a schematic view showing the overall structure of a carbonation device according to one embodiment of the present invention.

FIG. 3 shows an electrolysis device used for electrolysis.

FIG. 4 is the schematic view of a cylindrical separation device.

FIG. 5 shows measurement data of a surface charge of magnesium hydroxide depending on pH.

FIG. 6 shows measurement data of an Mg concentration in a filtered solution depending on pH.

FIG. 7 shows measurement data of a B concentration in a filtered solution depending on pH.

FIG. 8 shows measurement data of a Li concentration in a filtered solution depending on pH.

FIG. 9 shows measurement data of a Ca concentration in a filtered solution depending on pH.

FIG. 10 shows measurement data of a lithium concentration in a filtered solution depending reaction time.

FIG. 11 shows data on an extraction rate of lithium phosphate depending on a reaction temperature.

FIG. 12 shows data on a lithium concentration according to Example 6 and Comparative Example 1.

FIG. 13 shows XRD data of lithium carbonate according to Example 6.

FIG. 14 shows data on a lithium concentration change according to Comparative Example 2.

DETAILED DESCRIPTION OF THE INVENTION

Exemplary embodiments of the present invention will hereinafter be described in detail. However, these embodiments are only exemplary, and the present invention is not limited thereto.

As used herein, when a definition is not otherwise provided, the "substituted" refers to one where at least one hydrogen of a substituent or a compound is substituted with deuterium, a halogen, a hydroxy group, an amino group, a substituted or unsubstituted C1 to C20 amine group, a nitro group, a substituted or unsubstituted C3 to C40 silyl group, a C1 to C30 alkyl group, a C1 to C10 alkylsilyl group, a C3 to C30 cycloalkyl group, a C6 to C30 aryl group, a C1 to C20 alkoxy group, a fluoro group, a C1 to C10 trifluoroalkyl group such as a trifluoromethyl group, or a cyano group.

Two adjacent substituents selected from the substituted halogen group, hydroxy group, amino group, substituted or unsubstituted C1 to C20 amine group, nitro group, substituted or unsubstituted C3 to C40 silyl group, C1 to C30 alkyl group, C1 to C10 alkylsilyl group, C3 to C30 cycloalkyl group, C6 to C30 aryl group, C1 to C20 alkoxy group, fluoro group, C1 to 010 trifluoroalkyl group such as trifluoromethyl group, or cyano group may be fused to each other to form a ring.

As used herein, when specific definition is not otherwise provided, the term "hetero" refers to one including 1 to 3 hetero atoms selected from N, O, S, and P and remaining carbons in one functional group.

As used herein, when a definition is not otherwise provided, the term "combination thereof" refers to at least two substituents bound to each other by a linker or at least two substituents condensed to each other.

In the specification, when a definition is not otherwise provided, the term "alkyl group" may refer to an aliphatic hydrocarbon group. The alkyl group may be to a saturated group without any alkene group or alkyne group.

The alkyl group may be branched, linear, or cyclic.

The alkyl group may be a C1 to C20 alkyl group. More specifically, the alkyl group may be a C1 to C10 alkyl group or a C1 to C6 alkyl group.

For example, the C1 to C4 alkyl group may have 1 to 4 carbon atoms in an alkyl chain, and may be selected from methyl, ethyl, propyl, iso-propyl, n-butyl, iso-butyl, sec-butyl, and t-butyl.

Specific examples of the alkyl group may be a methyl group, an ethyl group, a propyl group, an isopropyl group, a butyl group, an isobutyl group, a t-butyl group, a pentyl group, a hexyl group, an ethenyl group, a propenyl group, a butenyl group, a cyclopropyl group, a cyclobutyl group, a cyclopentyl group, a cyclohexyl group, and the like.

In one embodiment of the present invention, a method for extraction of lithium from a solution including lithium is provided, which includes separating a solution including lithium into a monovalent ion-containing solution and another solution including ions having divalence or more using a separation membrane having a negative charge on the surface, and removing impurities from the monovalent ion-containing solution and adding a phosphorus-supplying material to the monovalent ion-containing solution where impurities are removed, and then precipitating lithium therein dissolved into lithium phosphate.

FIG. 1 schematically shows operation of the separation membrane according to one embodiment of the present invention.

As shown in FIG. 1, the separation membrane has a negative charge on the surface and thus may selectively separate ions. For example, the separation membrane having a negative charge has stronger repulsion against divalent anions such as $SO_4^{2-}$, $CO_3^{2-}$, and the like than monovalent anions such as $Cl^-$ and the like, and thus may hardly pass the divalent anions. The reason is that the charge size is proportional to an electrostatic force according to Coulomb's law. Accordingly, the divalent anions may be separated from the monovalent anions through the separation membrane having a negative charge.

In addition, the divalent anions form an electrostatic pair with divalent cations such as $Ca^{2+}$, $Mg^{2+}$, and the like. Accordingly, the divalent cations may hardly pass through the separation membrane along with the divalent anions. The reason is that the divalent cations have a larger size than the monovalent cations.

As aforementioned, the monovalent anions such as $Cl^-$ and the like relatively easily pass through the separation membrane. Accordingly, monovalent cations such as $Li^+$, $Na^+$, $K^+$, and the like forming an electrostatic pair with the monovalent anions may easily pass through the separation membrane therewith.

However, the separation membrane just physically separates ions and thus does not separate all the monovalent and divalent ions but separates the monovalent and divalent ions with high efficiency.

The separation membrane having a negative charge on the surface may have a pore size ranging from 0.5 to 1 nm. When the pore size is within the range, the monovalent ions may be effectively separated from the divalent ions.

The separation membrane having a negative charge on the surface may have a thickness ranging from 0.5 to 1.5 μm. When the thickness is within the range, the separation membrane may effectively separate the divalent cations such as $Ca^{2+}$, $Mg^{2+}$, and the like in brine from the divalent anions such as $SO_4^{2-}$, $CO_3^{2-}$, and the like, and thus increases extraction efficiency of lithium from a solution including lithium (e.g., brine).

The separation membrane having a negative charge on the surface may have a sulfone group on the surface. Specifically, the separation membrane having a negative charge on the surface may be fabricated by coating a sulfone group bringing about the negative charge on a polyamide substrate. However, the coating is not limited to the sulfone group, and may include any substituent having a negative charge on the surface. The substrate is not limited to the polyamide substrate.

In the process of removing impurities from the monovalent ion-containing solution, the impurities may be divalent ions non-separated in the process of separating a solution including lithium into a monovalent ion-containing solution and another solution including ions having divalence or more using the separation membrane having a negative charge on the surface.

More specifically, the impurities may include magnesium, boron, or calcium.

The solution including lithium may be brine, and the impurities may be most cations except for lithium included in the brine.

The method may further include naturally evaporating the monovalent ion-containing solution where impurities are removed, and then extracting sodium chloride.

As aforementioned, when the sodium chloride is first extracted by naturally evaporating a monovalent ion-containing solution before extracting lithium phosphate, the lithium phosphate in the monovalent ion-containing solution may be more concentrated and thus more effectively extracted. Specifically, the extraction of the lithium phosphate may be performed at room temperature. This process will be described later in more detail.

However, the extraction of the sodium chloride may be performed by naturally evaporating a filtered solution remaining after extracting the lithium phosphate.

The sodium chloride may be precipitated first in a form of a chloride salt due to a difference between concentration and solubility of the sodium chloride.

The monovalent ion-containing solution may be naturally heated in the open air.

The process of naturally heating the monovalent ion-containing solution may be performed after the process of removing impurities from the monovalent ion-containing solution.

The natural heating may be performed by exposing the monovalent ion-containing solution to solar light. The naturally heating may be more efficiently performed and thus may maintain purity of the concentrated monovalent ion-containing solution by adding water (fresh water) to the surface of the monovalent ion-containing solution after removing the impurities therefrom, and then exposing the resulting mixture to solar light.

When water (fresh water) is added to the surface of the monovalent ion-containing solution, the water (fresh water) may form a predetermined film on the surface of the monovalent ion-containing solution due to a weight difference.

The film may play a role of shielding the monovalent ion-containing solution from the outside and increase the internal temperature of the monovalent ion-containing solution. Accordingly, the film may increase efficiency of the naturally heating, which may concentrate the monovalent ion-containing solution for a short time and also maintain purity of the monovalent ion-containing solution.

This naturally heating may increase the internal temperature of the monovalent ion-containing solution up to about 50 to 90° C.

The process of removing impurities from the monovalent ion-containing solution may be a process of adding hydroxide anions to the monovalent ion-containing solution and precipitating and removing impurities including magnesium, boron, or calcium included in the monovalent ion-containing solution.

Specific examples of the hydroxide anions may be obtained from sodium hydroxide, calcium hydroxide, potassium hydroxide, and ammonium hydroxide (specific examples of the ammonium may be (NR₄)₃OH, wherein R is independently hydrogen, deuterium, or a substituted or unsubstituted C1 to C10 alkyl group). More specifically, the hydroxide anions may be anions of sodium hydroxide or calcium hydroxide.

Specifically, the hydroxide anions may be hydroxide salt anions, which are not precipitated as a by-product during the lithium extraction due to high solubility of its cations.

The process of adding the hydroxide anions to the monovalent ion-containing solution and precipitating and removing impurities including magnesium, boron, or calcium included in the monovalent ion-containing solution may be a process of adding hydroxide anions to the monovalent ion-containing solution to precipitate and remove impurities including magnesium, boron, or calcium included in the monovalent ion-containing solution.

The process of removing impurities from the monovalent ion-containing solution may include adding hydroxide anions to the monovalent ion-containing solution and then producing magnesium hydroxide from the magnesium, and maintaining pH of a filtered solution obtained after removing the magnesium in a range of greater than or equal to 12, and then precipitating calcium.

More specifically, the process of adding hydroxide anions to the monovalent ion-containing solution and precipitating and removing impurities including magnesium, boron, and/or calcium included in the monovalent ion-containing solution may be a process of adding hydroxide anions to the monovalent ion-containing solution and then producing magnesium hydroxide from the magnesium, adsorbing boron on the magnesium hydroxide, co-precipitating the magnesium and boron and recovering the co-precipitated magnesium and boron, and maintaining pH of a filtered solution obtained after removing the magnesium and boron to be greater than or equal to 12, and then precipitating calcium.

The processes of adding hydroxide anions and then producing magnesium hydroxide and adsorbing boron on the magnesium hydroxide and co-precipitating the magnesium and boron may be performed simultaneously or separately, depending on the amount of magnesium.

In other words, when the magnesium hydroxide is sufficiently produced and adsorbs most of the boron, the two aforementioned processes may be simultaneously performed. However, when the magnesium hydroxide is not sufficiently produced, the two processes may be separately performed.

Specifically, the magnesium may be produced into magnesium hydroxide by adding hydroxide anions (e.g. NaOH, Ca(OH)₂) to a monovalent ion-containing solution including Mg, B, and/or Ca according to one embodiment of the present invention.

Herein, the pH of the monovalent ion-containing solution including the hydroxide anions is maintained in a range of 8.5 to 10.5, so that the magnesium hydroxide may adsorb boron (e.g., boron ions) to co-precipitate the magnesium and the boron.

These processes may be simultaneously performed.

The hydroxide anions (e.g., NaOH) are added to the monovalent ion-containing solution to increase brine having neutral pH into a range of 8.5 to 10.5, and thus precipitate magnesium dissolved in the monovalent ion-containing solution into the sparingly-soluble magnesium hydroxide. The magnesium hydroxide has very low solubility of 0.009 g/L, and may be easily precipitated in a basic solution having pH of greater than or equal to 8.

In addition, the hydroxide anions maintain the pH of the monovalent ion-containing solution in a range of 8.5 to 10.5, so that boron (e.g., boron ions) may be adsorbed on the surface of the magnesium hydroxide and simultaneously be co-precipitated with magnesium.

Herein, the surface charge of the magnesium hydroxide may be used.

The surface charge of the magnesium hydroxide is largely changed depending on pH of a solution. When the magnesium hydroxide has a positive (+) surface charge, boron ions present as anions such as $H_2BO_3^-$, $HBO_3^{2-}$, or the like in the monovalent ion-containing solution is absorbed on the surface of the magnesium hydroxide, and thus magnesium and boron dissolved in the monovalent ion-containing solution may be simultaneously extracted and removed. However, when the magnesium hydroxide has a negative (−) surface charge, the boron ions having a negative charge are not adsorbed on the magnesium hydroxide.

When the monovalent ion-containing solution has relatively low pH of less than 8.5, magnesium dissolved therein may not be sufficiently precipitated into magnesium hydroxide, deteriorating a boron adsorption rate. On the contrary, when the monovalent ion-containing solution has relatively high pH of greater than 10.5, the magnesium hydroxide is negatively (−) charged on the surface and may not adsorb boron anions but lithium ions present as cations in the monovalent ion-containing solution, and thus lose lithium, resultantly deteriorating the lithium recovery rate.

Accordingly, the pH of the monovalent ion-containing solution may be maintained in a range of 8.5 to 10.5 by gradually adding hydroxide anions to the monovalent ion-containing solution to co-precipitate the magnesium and boron and simultaneously extract them.

Accordingly, the hydroxide anions in an appropriate amount are added to the monovalent ion-containing solution to maintain its pH in a range of 8.5 to 10.5 to adsorb boron (e.g., boron ions) to the surface charge of magnesium hydroxide and co-precipitating most of the magnesium and boron dissolved in the monovalent solution.

Then, in order to additionally co-precipitate magnesium and boron remaining in a filtered solution after co-precipitating most of the magnesium and boron, hydroxide anions (e.g., NaOH) are additionally added to the filtered solution to maintain pH of the solution in a range 8.5 to 10.5 and additionally co-precipitate the remaining magnesium and boron.

The reason for gradual addition of the hydroxide anions (e.g., NaOH) is that pH of the monovalent ion-containing solution is hard to maintain in a range of 8.5 to 10.5 when the hydroxide anions (e.g., NaOH) in a large amount are added to the monovalent ion-containing solution to precipitate all of the magnesium and boron dissolved therein, deteriorating efficiency of co-precipitating the magnesium and boron and losing lithium.

Then, the monovalent ion-containing solution is filtered to separate the magnesium hydroxide precipitated by adsorbing the boron and simultaneously recover the magnesium and boron, obtaining a filtered solution.

Next, hydroxide anions or carbonate anions (e.g., NaOH or a carbonate salt singularly or in a mixture) are added to the obtained filtered solution after removing the magnesium and boron to maintain pH of the filtered solution to be greater than 12 and precipitate calcium.

Herein, the calcium is precipitated into calcium hydroxide or calcium carbonate depending on whether the hydroxide anions or carbonate anions are used.

If pH of the monovalent ion-containing solution is maintained in a range of greater than 12 to remove calcium without filtrating and separating the magnesium hydroxide adsorbing boron and precipitated therein from the monovalent ion-containing solution, the pH of the monovalent ion-containing solution is out of the range of 8.5 to 10.5 and negatively (−) charges the surface of the magnesium hydroxide, and thus desorbs the boron on the surface but adsorbs lithium ions present as cations, deteriorating the boron recovery rate and losing lithium.

Since the calcium hydroxide and calcium carbonate have very low solubility and are easily precipitated when the solution has pH of greater than or equal to 12, pH of the filtered solution needs to be maintained to be greater than or equal to 12.

For example, an alkali and a carbonate salt may be added as a mixture.

The alkali may be at least one selected from NaOH, KOH, $Ca(OH)_2$, $NH_4OH$, or $R_4NOH \cdot 5H_2O$ (wherein R is independently a C1 to C10 alkyl group such as methyl, ethyl, propyl, or butyl).

When only the alkali (e.g., NaOH) is added to the monovalent ion-containing solution, $OH^-$ ions supplied from the alkali are mostly consumed to produce calcium hydroxide. Accordingly, the alkali (e.g., NaOH) in a considerable amount needs to be added to maintain pH of the filtered solution remaining after removing the magnesium and boron in a range of greater than or equal to 12. However, when the alkali (e.g., NaOH) along with carbonate salt is added to the filtered solution, the pH of the filtered solution is maintained in a range of 12 with a relatively small amount of the alkali (e.g., NaOH), which is economical.

Herein, the carbonate salt is added by using $Na_2CO_3$ or $K_2CO_3$ having high solubility singularly or a composite thereof. Herein, the Na or K included in the carbonate salt is dissolved in the filtered solution. In addition, the precipitated calcium hydroxide or calcium carbonate is filtered from the remaining filtered solution, recovering calcium.

The process of removing impurities from the monovalent ion-containing solution may be a process of reacting calcium in the monovalent ion-containing solution with a carbonation gas and removing the calcium in a form of a calcium carbonate salt.

The carbonation gas may be a carbon dioxide source or carbon dioxide itself. However, the carbonation gas is not limited thereto.

The process of reacting calcium cations in the monovalent ion-containing solution with the carbonation gas to separate calcium in a form of a calcium carbonate salt may be performed at pH 5 to 8.5. When the pH is within the range, the calcium ions in the solution including lithium may be extracted in a form of carbonate salt.

When the pH is greater than 8.5, magnesium hydroxide is produced, failing in selectively separating the calcium ions. In addition, when the pH is less than 5, a calcium carbonate salt is not produced.

The method may further include reacting magnesium in the monovalent ion-containing solution with a carbonation gas to remove the magnesium in a form of a magnesium carbonate salt after the process of reacting calcium in the monovalent ion-containing solution with the carbonation gas and removing the calcium in a form of a calcium carbonate salt.

The magnesium carbonate salt may be a magnesium hydrate, and more specifically, $MgCO_3 \cdot 3H_2O$.

The process of reacting magnesium cations in the monovalent ion-containing solution with the carbonation gas to remove the magnesium in a form of a magnesium carbonate salt may be performed at pH 5 to 12.

When the pH is within the range, the magnesium ions in the monovalent ion-containing solution may be selectively extracted in a form of a carbonate salt. When the pH is greater than 12, a large amount of alkali is unnecessarily consumed, resulting in inefficiency.

The process of reacting calcium ions or magnesium ions in a monovalent ion-containing solution with the carbonation gas and extracting the calcium or the magnesium in a form of a carbonate salt is appropriate for mass production. In addition, this process is effectively applied to a continuous process.

The process of reacting calcium cations in the monovalent ion-containing solution with the carbonation gas to separate the calcium in a form of a calcium carbonate salt, or the process of reacting magnesium cations in the monovalent ion-containing solution with the carbonation gas to remove the magnesium in a form of a magnesium carbonate salt, may include a process of spraying brine in a form of droplets into a carbonation reaction tank through a droplet spray unit of the carbonation reaction tank charged with the carbonation gas at a predetermined pressure.

The carbonation reaction tank may further include an alkali solution-supplying unit for adjusting pH of the monovalent ion-containing solution at the bottom.

The alkali solution-supplying unit may adjust pH of the monovalent ion-containing solution in a range 5 to 8.5 and separate calcium cations in the monovalent ion-containing solution in a form of calcium carbonate salt after separating the magnesium carbonate salt, and also adjust the pH in a range of 5 to 12 again and separate magnesium cations in the monovalent ion-containing solution in a form of magnesium carbonate salt. The pH is the same as aforementioned.

The carbonization for forming a carbonate salt may be performed using the following consecutive carbonation device.

FIG. 2 is a schematic view showing the overall structure of a carbonation device according to one embodiment of the present invention.

Hereinafter, the carbonation device is illustrated referring to FIG. 2.

According to one embodiment of the present invention, the carbonation device includes a storage tank 1 storing and supplying a solution for carbonation. The storage tank 1 is connected to a droplet spray unit 3 mounted in a carbonation reaction tank 2 and a pipe for transporting the solution.

The droplet spray unit 3 consists of a high-pressure pump 4 and a droplet spray nozzle 5. Specifically, a bottom end of the droplet spray nozzle 5 may be protruded from the top inside end of the carbonation reaction tank 2.

Herein, there may be more than one droplet spray nozzle 5 depending on the amount of the solution for treatment. When a plurality of the droplet spray nozzles 5 are mounted, the droplet spray nozzles 5 may be adjusted to respectively have different droplet dispersion angles, so that the droplets dispersed from the droplet spray nozzles 5 may not interfere with one another or contact the wall of the tank, increasing efficiency of a carbonation reaction.

In addition, the droplet spray unit 3 includes the high-pressure pump 4 and the droplet spray nozzle 5 that may be controlled to change the particle diameter of the droplets in a range of about 80 to about 200 μm. The particle diameter of the droplets may be changed to control the carbonation reaction.

The carbonation reaction tank 2 may be equipped with a carbonation gas supplying unit 7. Specifically, the carbonation gas supplying unit 7 is mounted on the top of the carbonation reaction tank 2.

The carbonation gas supplying unit 7 may consist of a pressure measuring unit 8 for measuring carbonation gas pressure inside the carbonation reaction tank 2, a carbonation gas supply valve 9, and a pressure control valve 10 for releasing surplus pressure in the carbonation reaction tank 2 to adjust pressure therein.

The pressure measuring unit 8 is for measuring carbonation gas pressure inside the tank and running the carbonation gas supply valve 9 and the pressure control valve 10. Accordingly, a pressure-measuring sensor is positioned in the center of the carbonation reaction tank 2 apart from the droplet spray nozzle 5 to minimize interference due to pressure of the droplets.

The carbonation gas supply valve 9 is a device that automatically supplies a carbonation gas from a carbonation gas storage tank 6 to the carbonation reaction tank 2 with a predetermined pressure. When carbonation gas in the carbonation reaction tank 2 is consumed due to a carbonation reaction and decreases a pressure therein, the carbonation gas supply valve 9 receives a signal from the pressure measuring unit 8 and automatically supplies as much carbonation gas as is consumed.

The carbonation gas supply valve 9 may set a carbonation gas pressure inside the carbonation reaction tank 2 in a range of a top pressure to 10 bar, a top pressure to 8 bar, a top pressure to 5 bar, or a top pressure to 3 bar.

The pressure control valve 10 receives a signal from the pressure measuring unit 8 and automatically runs and releases surplus pressure when the carbonation reaction tank 2 has a higher pressure than a predetermined carbonation gas pressure, resultantly controlling pressure in the carbonation reaction tank 2.

In addition, the carbonation device may include a safety valve 11 for rapidly removing excessive pressure in the tank.

The safety valve 11 automatically operates to rapidly release pressure for safety when the carbonation reaction tank 2 has a higher pressure than a predetermined pressure due to a malfunction of the carbonation device.

The carbonation reaction tank 2 may be safely operated under a pressure of greater than or equal to about 10 bar.

In addition, the droplets freely drop inside the carbonation reaction tank 2. Herein, the carbonation device may have a height of greater than or equal to about 3 meters such that the droplets may freely drop.

In addition, the carbonation reaction tank 2 may have a diameter of greater than or equal to 1 meter to prevent the droplets from contacting the wall thereof during the free dropping of the droplets.

Further, the carbonation reaction tank 2 may be made of PVC, PE, or concrete with high strength to prevent corrosion due to brine and the like.

When a metal such as stainless steel is used, the wall surface of the tank where brine contacts the stainless steel that is weak against corrosion may be coated with TEFLON (tetrafluoroethylene), urethane, or the like.

The alkali solution supply device may include: a pH measuring unit 12 measuring pH inside the carbonation reaction tank 2; an alkali solution input pump 13 supplying the carbonation reaction tank 2 with an alkali solution depending on the pH measured by the pH measuring unit 12; and an alkali solution input nozzle 14 connected to the alkali solution input pump 13 and supplying the carbonation reaction tank 2 with the alkali solution.

The alkali solution may specifically be a NaOH solution.

The pH measuring unit 12 may automatically measure pH of a reaction slurry and operate the alkali solution input pump 13 using the measured signal.

Accordingly, the alkali solution may be supplied to the reaction slurry to have a desired pH through the alkali solution input nozzle 14.

Then, the alkali solution may be agitated with the slurry using a slurry agitating unit 15 to promote the reaction.

In addition, the carbonation reaction tank 2 may include a level measuring unit 16 for drawing out the reaction slurry and a withdrawer for drawing out the slurry from inside of the carbonation reaction tank.

The withdrawer for drawing out the slurry inside the carbonation reaction tank may include a rotary dump valve 17.

The level measuring unit 16 may automatically measure the level of slurry built up in the carbonation reaction tank 2 when the carbonation reaction is complete and then send a signal to automatically operate the rotary dump valve 17.

The rotary dump valve 17 consecutively and automatically releases the slurry from the carbonation reaction tank 2 based on the slurry level information received from the level measuring unit 16 to maintain a predetermined slurry level.

The rotary dump valve 17 may maintain air-tightness during the operation to minimize a pressure change in the carbonation reaction tank 2.

The slurry agitating unit 15 may prevent the extracted carbonate from being precipitated and built up in the carbonation reaction tank 2, thus hindering operation of the rotary dump valve 17.

On the carbonation reaction tank 2, a vacuum valve 18 is mounted and connected to a vacuum pump.

Hereinafter, operation of a carbonation device having the aforementioned structure is illustrated.

First of all, the vacuum valve 18 is opened and the vacuum pump is operated, removing the air remaining in the carbonation reaction tank 2.

When the air in the carbonation reaction tank 2 is sufficiently removed, the vacuum valve is closed, and the carbonation gas supply valve 9 is opened to supply the carbonation gas to the carbonation reaction tank.

When the carbonation gas pressure inside the carbonation reaction tank 2 reaches a predetermined level, the carbonation gas supply valve 9 is closed, and the droplet spray unit 3 is operated to disperse droplets having a predetermined particle diameter through the droplet spray nozzle 5 into the tank 2.

For example, the dispersed droplets freely drop due to gravity inside the carbonation reaction tank 2, and carbonation gas that is excessively charged inside the tank is dissolved in the droplets and forms carbonate ions ($CO_3^{2-}$). The carbonate ions ($CO_3^{2-}$) react with cations for carbonation in the droplets and precipitate a carbonate.

Herein, the carbonation reaction may become efficient and maximized by adjusting the particle diameter of the droplets and thus the specific surface area of the droplets contacting carbonation gas, controlling the dropping speed of the droplets, and thus a reaction time and regulating pressure of the carbonation gas, thus controlling the dissolution rate of the carbonation gas.

The carbonation reaction consumes carbonation gas charged in the carbonation reaction tank 2 and reduces pressure in the tank 2.

When the carbonation gas pressure is reduced, the pressure measuring unit 8 senses the reduction and operates the carbonation gas supply valve 9 and the pressure control valve 10 to automatically maintain a predetermined carbonation gas pressure in the carbonation reaction tank 2.

On the other hand, when a solution including a large amount of cations for carbonation dissolved therein is carbonated, more carbonation gas is dissolved in the solution. When the carbonation gas is dissolved in a large amount, pH of the solution may drop to less than or equal to about 4 at most.

Herein, the dissolved carbonation gas exists as bicarbonate ions ($HCO_3^{1-}$). In general, a compound produced through combination of the bicarbonate ions with cations has high solubility and thus is not well precipitated.

When this solution is released to the outside under normal pressure, the oversaturated carbonation gas is rapidly released, sharply deteriorating carbonation efficiency.

Accordingly, the bicarbonate ions ($HCO_3^{1-}$) are changed into carbonate ions ($CO_3^{2-}$) and a carbonate salt is precipitated by increasing pH of the solution including carbonation gas dissolved therein inside a carbonation reaction tank under pressure when the carbonation reaction is complete.

Specifically, pH of the solution in the carbonation reaction tank 2 is automatically measured using the pH measuring unit 12, and the measured pH signal operates the alkali solution input pump 13.

The alkali solution input pump 13 may inject an alkali solution through the alkali solution input nozzle 14 into the bottom solution in the carbonation reaction tank 2 until the bottom solution is adjusted to have a predetermined pH.

The slurry agitating unit 15 may play a role of rapidly agitating the alkali solution with the slurry.

On the other hand, as droplets continually drop from the top to the slurry complete with a carbonation reaction in the carbonation reaction tank 2, the level of the slurry is increased. When the level of the slurry reaches a predetermined level, the level measuring unit 16 senses the reaching of the predetermined level and automatically operates the rotary dump valve 17 and consecutively releases the slurry out of the carbonation reaction tank 2.

Herein, the slurry agitating unit 15 may prevent a carbonate precipitate in the slurry from settling and being built up at the bottom of the tank.

When the carbonation device is used to recover lithium (Li) in the monovalent ion-containing solution, impurities such as magnesium ions, calcium ions, and the like in the monovalent ion-containing solution may be extracted.

In addition, the carbonation device may be used to transform lithium recovered in a form of lithium hydroxide into lithium carbonate. This transformation will be described later.

A plurality of the aforementioned carbonation devices may be used. Herein, a filtered solution is obtained by drawing out the slurry through one carbonation device and then injecting it into a droplet spray unit in another carbonation device.

For example, when the aforementioned monovalent ion-containing solution is used as a solution for carbonization, calcium ions are carbonated and precipitated in a first carbonation device. Then, a filtered solution obtained after filtering the precipitate is injected into a second carbonation device to carbonate magnesium ions.

The solution including lithium may specifically be brine.

The brine may include Li at 0.2 to 1.7 g/L, Mg at 0.005 to 25 g/L, Ca at 0.005 to 15 g/L, Na at 70 to 120 g/L, K at 1 to 40 g/L, B at 0.1 to 3 g/L, and the like.

However, the brine may include cations in various amounts depending on a region, and specifically, Li at 0.6 to 1.7 g/L, Mg at 0.005 to 0.060 g/L, Ca at <0.005 g/L, Na at 100 to 120 g/L, K at 25 to 35 g/L, B at 2 to 3 g/L, and the like.

Then, lithium dissolved in the monovalent ion-containing solution where impurities are removed may be extracted into lithium phosphate by adding a phosphorus-supplying material thereto.

Conventionally, lithium carbonate ($Li_2CO_3$) is directly extracted from sea water, brine, minerals, or the like to obtain lithium with high purity, but has solubility in water of about 13 g/L and is relatively much dissolved in water. As for the brine including lithium in a small amount (about 8.0 g/L when converted into lithium carbonate), lithium carbonate may be produced from the brine but is re-dissolved and hardly extracted.

On the contrary, according to one embodiment of the present invention, lithium may be extracted into lithium phosphate having very low solubility (about 0.39 g/L) by adding a phosphorus-supplying material to the monovalent ion-containing solution where impurities are removed. In other words, the lithium extraction method according to one embodiment of the present invention may easily extract even a small amount of lithium dissolved in the monovalent ion-containing solution where impurities are removed (about 2.5 to 17.0 g/L when converted into lithium phosphate) into lithium in a solid state.

The phosphorus-supplying material may include phosphorus, phosphoric acid, a phosphate salt, or a mixture thereof. The phosphorus-supplying material is added to the monovalent ion-containing solution where impurities are removed, and thus may form lithium phosphate. In addition, the monovalent ion-containing solution where impurities are removed may have a concentration (a dissolution concentration of lithium phosphate) of greater than or equal to 0.39 g/L, so that the lithium phosphate is precipitated in a solid state without being re-dissolved in the monovalent ion-containing solution where impurities are removed.

In the process of adding a phosphorus-supplying material to the monovalent ion-containing solution where impurities are removed and then precipitating lithium dissolved therein into lithium phosphate, the monovalent ion-containing solution may have a lithium concentration of greater than or equal to 0.1 g/L. When the lithium concentration is within the range, lithium phosphate may be more effectively extracted.

However, the phosphorus-supplying material may change pH of the monovalent ion-containing solution where impurities are removed (e.g., phosphoric acid). For example, when the phosphorus-supplying material decreases pH of the monovalent ion-containing solution, lithium phosphate is precipitated but may be re-dissolved therein. Accordingly, hydroxide ions may be used with the phosphorus-supplying material to prevent the re-dissolution.

Specific examples of the phosphate salt may be potassium phosphate, sodium phosphate, and ammonium phosphate (specific examples of the ammonium is $(NR_4)_3PO_4$ wherein the R is independently hydrogen, deuterium, or a substituted or unsubstituted C1 to C10 alkyl group).

More specifically, the phosphate salt may be monopotassium phosphate, di-potassium phosphate, tripotassium phosphate, monosodium phosphate, disodium phosphate, trisodium phosphate, aluminum phosphate, zinc phosphate, polyammonium phosphate, sodium hexametaphosphate, monocalcium phosphate, dicalcium phosphate, tricalcium phosphate, and the like.

When the phosphorus-supplying material is water-soluble, the phosphorus-supplying material may be easily reacted with lithium included in the monovalent ion-containing solution where impurities are removed.

Then, the lithium phosphate precipitate is filtered and separated from the monovalent ion-containing solution where impurities are removed.

The process of extracting lithium phosphate by adding the phosphorus supplying material to the monovalent ion-containing solution where impurities are removed may be performed at room temperature, for example, greater than or equal to 20° C., greater than or equal to 30° C., greater than or equal to 50° C., or greater than or equal to 90° C. In the specification, "room temperature" does not denote a predetermined temperature, but is a temperature having no external energy addition. Accordingly, the room temperature may vary depending on place and time.

In addition, the filtered solution is heated at room temperature, 40 to 200° C., 50 to 200° C., 60 to 200° C., 70 to 200° C., 80 to 200° C., or 90 to 200° C. for 5 to 15 minutes after adding the phosphorus supplying material to precipitate lithium phosphate. Heating at a higher temperature for a longer time may have an advantageous influence on a reaction for producing lithium phosphate. However, when the heating is performed for greater than 15 minutes at a temperature of higher than 200° C., a rate of producing lithium phosphate may be saturated.

After the precipitation of lithium dissolved in the monovalent ion-containing solution where impurities are removed into lithium phosphate, the lithium phosphate precipitate may be filtered and separated from the filtered solution, recovering the lithium phosphate. The recovered lithium phosphate is washed, obtaining lithium phosphate powder having high purity.

In addition, the lithium phosphate may be more effectively extracted using the nucleus particles.

More specifically, the process of adding a phosphorus supplying material to the monovalent ion-containing solution where impurities are removed and then precipitating dissolved lithium into lithium phosphate may include adding nucleus particles to the monovalent ion-containing solution where impurities are removed, and adding a phosphorus supplying material to the monovalent ion-containing solution including the added nucleus particles and then precipitating dissolved lithium into lithium phosphate.

The nucleus particles may be homogenous nucleus particles. In addition, the nucleus particles may be heterogeneous nucleus particles. However, the nucleus particles have no limit in shape.

The nucleus particles may have a particle diameter of less than or equal to 100 μm. More specifically, the nucleus particles may have a particle diameter of less than or equal to 6 μm or less than or equal to 1 μm. The particle diameter may be an average particle diameter. In addition, the smaller the particle diameter is, the more efficiently the lithium phosphate is extracted, but the present invention is not limited to the range.

Furthermore, the nucleus particles may be insolvable in the monovalent ion-containing solution where impurities are removed.

The nucleus particles may promote efficiency of precipitating the lithium phosphate from the monovalent ion-containing solution where impurities are removed. The reason is that the nucleus particles may lower activation energy when the lithium phosphate is precipitated in the monovalent ion-containing solution where impurities are removed.

The nucleus particles may be a lithium compound. However, the nucleus particles have no limit in a kind. For example, the nucleus particles may include metal particles, inorganic compound particles, organic compound particles, and the like.

For example, the nucleus particles may include $Li_3PO_4$, $Li_2CO_3$, $Li_2SO_4$, or a combination thereof. For another example, the nucleus particles may include MgO, $MgAl_2O_4$, $Al_2O_3$, plastic particles, or a combination thereof.

However, since the nucleus particles are present as impurities during the precipitation of the lithium phosphate, the lithium phosphate itself as a desired material may be used as the nucleus particles.

The nucleus particles in an amount of 0.05 g/L based on the amount of a solution including lithium may be added to the monovalent ion-containing solution where impurities are removed.

The lithium phosphate may be electrolysized to obtain lithium hydroxide. Specifically, the electrolysis of the lithium phosphate may be performed by using an electrolysis device including an anode cell and a cathode cell partitioned by a cation exchange membrane.

The electrolysis method and/or the electrolysis device include an anode cell, a cathode cell, and a cation exchange membrane and have no limit in constitution of the device, an order in the method, and the like. For example, the electrolysis device may have a batch shape, a continuous shape, a cyclic shape, or the like.

Specifically, the cycle-shaped electrolysis device has an advantage of reusing a byproduct (e.g., excessive $PO_4^{3-}$) produced from an anode cell and a cathode cell. Accordingly, the electrolysis device may minimize reaction impurities and is thus is economically and environmentally advantageous.

FIG. 3 shows one electrolysis device used for the electrolysis.

Specifically, a lithium phosphate aqueous solution having a high concentration is prepared by dissolving lithium phosphate in an aqueous solution including phosphoric acid to increase solubility. The electrolysis device includes an anode cell mounted with an anode and a cathode cell mounted with a cathode, which are partitioned by a cation exchange membrane.

The lithium phosphate aqueous solution is injected into the anode cell of the electrolysis device, while de-ionized water is injected into the cathode cell of the electrolysis device.

The anode is a consumption electrode capable of being dissolved in an electrolysis bath of the anode cell and forming an alloy with lithium ions, and thus should have low reactivity with the lithium ions. Specifically, when carbon is used for the anode, the carbon may be consumed and released as $CO_2$ gas and suppress a reaction with the lithium ions.

On the other hand, the cathode may also use a material having low reactivity with the lithium ions to increase a lithium recovery rate, for example, a metal selected from iron, nickel, and stainless steel, or a metal selected therefrom and having a plating layer thereon.

The cation exchange membrane contacts the lithium phosphate aqueous solution of the anode cell and the aqueous solution of the cathode cell, may be formed of a porous material transferring lithium ions, and has porosity of 10 to 50%. When the cation exchange membrane has porosity of greater than 50%, the lithium phosphate aqueous solution moves from the anode cell to the cathode cell, deteriorating electrolysis efficiency. When the cation exchange membrane has porosity of less than 10%, the cation exchange membrane has difficulty in applying an electric current and deteriorates a transportation rate of lithium ions.

The cation exchange membrane may be a polymer membrane including at least one functional group selected from a sulfonic acid group, a carboxylic acid group, a phosphonic acid group, a sulfuric acid ester group, a fluorine group, and a phosphoric acid ester group (a phosphate ester group). The polymer membrane improves the selective transmission degree of lithium cations having monovalence and may suppress a multivalent cations such as calcium, magnesium, and the like from being passed or suppress or exclude phosphoric acid ions, which are anions, from being passed.

In addition, the electrolysis device includes tanks respectively supplying the anode cell and the cathode cell with a lithium phosphate aqueous solution and an aqueous solution, and circulates each electrolyte solution. In other words, the tanks are connected to each other through a circulating line, so that the electrolyte solutions discharged from each cell are respectively circulated back to the cells through the tanks to perform electrolysis. Then, the anode cell is measured regarding voltage. When the voltage is greater than a predetermined cell voltage, the lithium phosphate aqueous solution supplied to the anode cell is too concentrated to be appropriate for electrolysis. Accordingly, the anode cell needs to be supplied with a new lithium phosphate aqueous solution through a supply line.

As shown in FIG. 3, a lithium phosphate aqueous solution is injected into the anode cell, while an aqueous solution is injected into the cathode cell. Then, when a current is applied to the electrolysis device, the lithium phosphate aqueous solution is decomposed into lithium ions and phosphoric acid ions in the anode cell. The lithium ions pass through the cation exchange membrane and move to the cathode cell and are then recovered into a lithium metal.

The electrolysis is performed under a condition such as a current density of 0.01 to 0.075 A/cm$^2$ and a temperature of 15 to 25° C. When the current density is less than 0.01 A/cm$^2$, the lithium metal may be recovered at a low rate at the cathode. When the current density is greater than 0.075 A/cm$^2$, the cathode may have an excessive exothermic reaction, making the temperature of an electrolytic bath difficult to manage. In addition, the electrolysis temperature is controlled at room temperature ranging from 15 to 25° C., because the electrolytic bath is not only solidified, but a current is also well applied.

Furthermore, the electrolysis reduction may be performed by controlling the anode cell and the cathode cell under an inert gas atmosphere. The reason is that the inert gas atmosphere suppresses a contact reaction of the anode and cathode cells and prevents deterioration of electrolysis efficiency when the cathode of the cathode cell produces metal lithium and discharges hydrogen gas, while the anode of the anode cell produces oxygen gas or sometimes carbon dioxide gas. Herein, the inert gas may be argon.

In addition, the anode produces electrons when oxygen ions of the de-ionized water are converted into oxygen gas, while the cathode produces hydrogen gas when protons of the de-ionized water receive the electrons. The oxygen gas and hydrogen gas are externally released through an outlet on top of the electrolysis device.

Anode(+): $2O^{2-} \rightarrow O_2(g) + 4e^-$

Cathode(−): $4H^+ + 4e^- \rightarrow 2H_2(g)$      [Reaction Scheme 1]

In this way, when the lithium phosphate aqueous solution is electrolysized in the anode cell, the cation exchange membrane selectively transmits lithium ions and thus gradually deteriorates a lithium ion concentration but gradually increases a phosphoric acid ion concentration, resultantly gradually deteriorating pH of the electrolyte solution.

On the contrary, as the lithium ions transmitted through the cation exchange membrane are gradually concentrated in the cathode cell, while protons in the aqueous solution are discharged into hydrogen gas, pH of the electrolyte solution is gradually increased, which produces a highly concentrated lithium hydroxide aqueous solution in the cathode cell.

In addition, the lithium ion-concentrated solution of the cathode cell needs to have pH of greater than 7 and maintain basicity after the electrolysis. The reason is that when lithium is carbonated and is processed into lithium carbonate ($Li_2CO_3$), the lithium carbonate has high solubility and may be re-dissolved in a solution having pH of less than 7. Accordingly, an alkali such as NaOH and the like may be added to the solution to adjust the pH. Since the lithium ion-concentrated solution has pH of greater than 7 and maintains basicity in the cathode cell due to the electrolysis, lithium may be more simply and easily carbonized.

On the other hand, when the lithium phosphate aqueous solution is added to the anode cell for electrolysis, the lithium phosphate aqueous solution is electrolysized in the anode cell and separated into phosphoric acid ions and lithium ions. The lithium ions move toward the cathode cell through the cation exchange membrane. Accordingly, since the phosphoric acid ions are included in the anode cell, the recovered lithium phosphate may be directly added to the anode cell to prepare a lithium phosphate aqueous solution, which is injected into the anode cell to easily extract lithium through electrolysis. Herein, the lithium phosphate aqueous solution may not be separately prepared by dissolving lithium phosphate in phosphoric acid.

In addition, the electrolysis may further include reacting the lithium hydroxide with carbonation gas or a carbonate-containing material and forming lithium carbonate.

The lithium hydroxide aqueous solution obtained through the electrolysis may be reacted with carbonation gas or a carbonate-containing material to precipitate lithium therein into lithium carbonate having high purity. Since the lithium hydroxide aqueous solution obtained through the electrolysis is a highly Li concentrated aqueous solution obtained after other impurities such as Mg and the like are almost all removed, the lithium hydroxide aqueous is reacted with solution carbonation gas (e.g., $CO_2$) or a carbonate-containing material, precipitating lithium into lithium carbonate having high purity.

Herein, the precipitated lithium carbonate is filtered and may then be additionally washed to increase its purity.

In fact, the lithium hydroxide aqueous solution concentrated through the electrolysis is reacted with $CO_2$ gas, preparing lithium carbonate having high purity of greater than or equal to 99.99%.

On the other hand, the carbonization for forming a carbonate salt may be performed by using the aforementioned continuous carbonation device.

In one embodiment of the present invention, by the process of preparing a lithium phosphate aqueous solution including the precipitated lithium phosphate particles, adding a phosphoric acid anion precipitation agent to the lithium phosphate aqueous solution, and reacting cations of the phosphoric acid anion precipitation agent with phosphoric acid anions of the lithium phosphate to precipitate a sparingly-soluble phosphoric acid compound, a lithium hydroxide aqueous solution may be obtained.

The sparingly-soluble phosphoric acid compound may have lower solubility for water than the lithium phosphate.

One embodiment of the present invention is illustrated taking an example of calcium hydroxide as the phosphoric acid anion precipitation agent.

The method of manufacturing a lithium hydroxide aqueous solution according to one embodiment of the present invention is performed according to the following Reaction Scheme 2.

$$3Li_3PO_4 + 5Ca(OH)_2 \rightarrow Ca_5(PO_4)_3 \cdot OH \text{ (precipitation)} + 9Li^+ + 9OH^-$$ [Reaction Scheme 2]

In other words, when lithium phosphate and calcium hydroxide are partially dissolved in water, $Ca^{2+}$ ions react with phosphoric acid anions ($PO_4^{3-}$) produced from the lithium phosphate, precipitating a stable and sparingly-soluble phosphoric acid compound (e.g., hydroxyapatite).

When the sparingly-soluble phosphoric acid compound is precipitated, $Li^+$ and $OH^-$ are left in the solution, obtaining a lithium hydroxide aqueous solution.

In addition, when the sparingly-soluble phosphoric acid compound keeps being precipitated, the $Li^+$ and $OH^-$ are left in a higher concentration in the solution, obtaining a highly-concentrated lithium hydroxide aqueous solution.

According to the embodiment of the present invention, the lithium phosphate and the calcium hydroxide respectively have solubility of 0.39 g/L and 1.73 g/L, and thus are stable as a sparingly-soluble compound (or a salt). However, since the hydroxyapatite has very much lower solubility than the lithium phosphate and the calcium hydroxide and is relatively stable compared therewith, the hydroxyapatite precipitate may be obtained according to the reaction scheme divalent forward reaction. The hydroxyapatite is known to have solubility almost near to 0 g/L when its pH is increased.

The phosphoric acid anion precipitation agent may be an oxide or hydroxide. Specifically, the phosphoric acid anion precipitation agent produces $OH^-$ and is simultaneously combined with phosphoric acid anions produced from the lithium phosphate, and thus produces a sparingly-soluble phosphoric acid compound.

More specifically, the cations of the phosphoric acid anion precipitation agent may be an alkaline earth metal.

For example, the cations of the phosphoric acid anion precipitation agent may be cations of calcium, strontium, barium, radium, beryllium, magnesium, or a combination thereof, but is not limited thereto.

For example, the phosphoric acid anion precipitation agent may be $Ca(OH)_2$, $Mg(OH)_2$, and the like. According to another embodiment, the phosphoric acid anion precipitation agent may be CaO and the like. For example, the CaO may be obtained by heating $CaCO_3$. When water is added to the CaO, the $Ca(OH)_2$ may be produced.

When the phosphoric acid anion precipitation agent is calcium hydroxide, the sparingly-soluble phosphoric acid compound may be hydroxyapatite.

When the obtained hydroxyapatite is treated with sulfuric acid, plaster ($5CaSO_4 \cdot 2H_2O$) is precipitated, recovering phosphoric acid ($H_3PO_4$).

The recovered phosphoric acid may be reused in a method of reproducing lithium phosphate according to the present invention. This method is environmentally friendly and economical.

The lithium phosphate aqueous solution may include lithium phosphate particles having a diameter ranging from 0.01 μm to 40 μm. The lithium phosphate particles have a surface area ranging from 1.0 m²/g to 100 m²/g. When the surface area is within the range, the sparingly-soluble lithium phosphate may be partially but more effectively dissolved in water.

The phosphoric acid anion precipitation agent may be added in an amount of greater than or equal to 1 equivalent, and more specifically, greater than or equal to 2 equivalents relative to the lithium phosphate in the lithium phosphate aqueous solution. The addition of the phosphoric acid anion precipitation agent within the range may improve the reaction rate.

In addition, the method of manufacturing the lithium hydroxide aqueous solution may be performed at room temperature. Specifically, the method may be performed at a temperature of greater than 20° C., greater than 30° C., greater than 50° C., or greater than 90° C. When the temperature is increased, reaction efficiency may be improved.

The lithium phosphate in the lithium phosphate aqueous solution including the lithium phosphate particles may have a concentration of greater than or equal to 0.01%. When the concentration is within the range, the lithium hydroxide may be more efficiently obtained. The "%" may denote "wt %."

The method may further include separating the precipitated sparingly-soluble phosphoric acid compound from the lithium hydroxide aqueous solution.

The separated lithium hydroxide aqueous solution may be concentrated using reverse osmosis. The separated lithium hydroxide aqueous solution may in general have a concentration of about 5000 ppm. However, the lithium hydroxide aqueous solution may be more concentrated to obtain lithium carbonate in the following step.

The reverse osmosis is one of various concentration methods, but the present invention is not limited thereto.

The concentrated lithium hydroxide aqueous solution may have a concentration of greater than or equal to 9000 ppm. When the concentrated lithium hydroxide aqueous solution has a concentration within the range, the lithium hydroxide aqueous solution may be easily converted into lithium carbonate as aforementioned.

The method of extracting lithium may further include reacting the separated lithium hydroxide aqueous solution with carbonation gas or a carbonate-containing material to obtain lithium carbonate. This carbonation reaction may be performed using the aforementioned carbonation device. The carbonation device has been already illustrated and so a further description thereof is omitted.

The method may further include extracting borax from the monovalent ion-containing solution including the precipitated lithium phosphate.

The borax may be extracted by adjusting pH of the monovalent ion-containing solution including a precipitated lithium phosphate. When the pH adjustment is accompanied with simultaneous addition of nucleus particles, the borax may be more effectively extracted.

The borax extraction may be performed using a aeration reaction channel-type boron (B) recovery reactor, a continuous circular precipitation tank continuously separating a brine suspension solution including a large amount of borax into borax slurry having a high concentration and a clear brine filtered solution, and a solid/liquid separation device continuously separating the borax slurry having a high concentration into a borax cake and the clear brine filtered solution.

On the other hand, the filtered solution including borax extracted therein is naturally evaporated, and an anion surfactant is added thereto to extract a potassium compound. The natural evaporation may be the same as aforementioned.

The available anion surfactant may be SDS (sodium dodecyl sulfate), DDA (dodecyl amine), sodium oleate, and the like. The addition of the anion surfactant makes the surface of the potassium compound hydrophobic, and the potassium compound may be selectively floated and separated.

The extraction of the potassium compound may have an improved yield by pre-separating divalent ions (e.g., $SO_4^{2-}$) using the aforementioned separation membrane having a negative charge. This is because the formation of $K_3Na(SO_4)_2$, a potential impurity, is minimized.

The process of separating a solution including lithium into a monovalent ion-containing solution and another solution including ions having divalence or more using a separation membrane having a negative charge on the surface may be performed by a cylindrical separation device.

FIG. 4 is a schematic view showing the cylindrical separation device.

As shown in FIG. 4, the solution including lithium may be added from the bottom of the cylindrical separation device. The addition method from the bottom may remove air in the separation device and increase separation efficiency. However, the separation device is not limited thereto.

According to one embodiment of the present invention, when the separation membrane having a negative charge is used to separate monovalent ions from ions having divalence or more, efficiency of removing impurities may be improved. In addition, the separation membrane may decrease a raw material cost in terms of a compound used for removing the impurities, electricity, and the like, and thus is very economical.

Hereinafter, the embodiments are illustrated in more detail with reference to examples. These examples, however, should not in any sense be interpreted as limiting the scope of the present invention.

EXAMPLE 1

Separation of Monovalent Ions Using Separation Membrane

Brine having the following composition was prepared and then separated using a separation device including a separation membrane having anions. The separation membrane was SR100 made by Coach Corporation.

The following Table 1 shows a composition change of the brine before and after passing through the separation membrane.

TABLE 1

| Ions | Mg | Ca | Na | K | Li | B | $SO_4$ | Cl |
|---|---|---|---|---|---|---|---|---|
| Brine before treatment | 9680 | 520 | 78,740 | 8701 | 1100 | 447 | 25,600 | 151,200 |
| Brine after treatment | 4030 | 315 | 75,070 | 8800 | 1100 | 418 | 5,120 | 154,490 |

As shown in Table 1, $Mg^{2+}$ and $Ca^{2+}$ had a sharply decreased concentration due to the separation membrane. In addition, $SO_4^{2-}$ ions had a sharply decreased concentration. On the contrary, the concentration of monovalent ions was not changed much.

EXAMPLE 2

Surface Charge of Magnesium Hydroxide Depending on pH

NaOH was added to brine including 20,000 ppm of magnesium ions, 900 ppm of boron ions, 350 ppm of calcium ions, and 900 ppm of lithium ions to adjust pH of the brine and precipitate magnesium hydroxide. The precipitated magnesium hydroxide was measured regarding surface charge. The results are provided in FIG. 5.

As shown in FIG. 5, when the brine including the NaOH added thereto has pH ranging from 8.5 to 10.5, magnesium hydroxide maintained positive charges (+) on the surface. Accordingly, the magnesium hydroxide co-precipitated magnesium and boron from the brine and effectively extracted the magnesium and boron as well as easily adsorbed boron anions but not lithium cations, and thus minimized lithium loss.

EXAMPLE 3

Impurities Depending on pH

Magnesium hydroxide was precipitated by changing pH of the brine including 20,000 ppm of magnesium ions, 900 ppm of boron ions, 350 ppm of calcium ions, and 900 ppm of lithium ions. The precipitated magnesium hydroxide was filtered and separated from the brine. The remaining solution after filtration was measured regarding each amount of magnesium, boron, and lithium. The results are respectively provided in FIGS. 6, 7, and 8.

FIG. 6 provides data of a Mg concentration in the filtered solution depending on pH, FIG. 7 provides data of a B concentration in the filtered solution depending on pH, and FIG. 8 provides data of a Li concentration in the filtered solution depending on pH.

As shown in FIG. 6, the pH of the brine was not much changed even though the addition of the NaOH was initially increased, since OH ions were consumed to produce the magnesium hydroxide. However, when the NaOH was increasingly added, the amount of magnesium in the filtered solution was gradually decreased while the OH ions were gradually increased, which increased the pH of the brine. When the pH of the brine reached 9.8, the amount of the magnesium in the filtered solution decreased down to 4 ppm, which shows that 99.98% of the magnesium dissolved in the brine was extracted.

In addition, as shown in FIG. 7, the boron ions dissolved in the brine were decreased as the addition of the NaOH was initially increased. The reason is that magnesium hydroxide was precipitated as the NaOH was initially added and positively (+) charged on the surface in the brine having pH of less than or equal to 10.5, and accordingly, boron anions in the filtered solution were adsorbed on the surface of the magnesium hydroxide and co-precipitated.

As shown in FIG. 8, lithium ions were not changed, even though the addition of the NaOH was initially increased. The reason is that the magnesium hydroxide was positively (+) charged on the surface, and positive lithium ions in the brine were not adsorbed on the surface of the magnesium hydroxide. However, when the NaOH was excessively added and sharply increased the pH of the brine over 10.5, the magnesium hydroxide was negatively charged on the surface and thus did not adsorb the boron anions and increased the concentration of the boron ions in the filtered solution. On the contrary, the lithium cations in the filtered solution were adsorbed on the surface of the magnesium hydroxide and had a sharply decreased concentration.

Accordingly, the addition of the NaOH needs to be gradually adjusted to maintain the pH of the brine in a range of 8.5 to 10.5 to simultaneously remove both magnesium and boron and minimize lithium loss from the brine.

EXAMPLE 4

Amount of Ca Depending on pH

NaOH was added to brine including 20,000 ppm of magnesium ions, 900 ppm of boron ions, 350 ppm of calcium ions, and 900 ppm of lithium ions to precipitate the calcium ions into calcium hydroxide. The calcium hydroxide was filtered and separated from the brine, and the amount of calcium was measured. The results are provided in FIG. 9.

As shown in FIG. 9, as the NaOH was increasingly added, the amount of calcium in the filtered solution was gradually decreased. When the brine had pH of 12, the amount of calcium in the filtered solution decreased down to 6.5 ppm, which shows that greater than or equal to 98% of calcium dissolved in the brine was recovered. Accordingly, the pH of the brine needs to be increased up to greater than or equal to 12 in order to increase the recovery rate of the calcium from the brine.

However, when the pH of the brine was increased up to greater than or equal to 12 from the beginning of the reaction, the precipitated magnesium hydroxide was negatively (−) charged on the surface and adsorbed lithium cations but no boron anions and caused lithium loss. The pH of the brine was maintained in a range of 8.5 to 10.5 before adding the NaOH to extract calcium to precipitate magnesium hydroxide positively (+) charged on the surface, and thus prevent adsorption of lithium ions but adsorb boron ions to simultaneously co-precipitate magnesium and boron. Then, the pH of the remaining solution after removing the magnesium and boron was increased to precipitate calcium into calcium hydroxide.

EXAMPLE 5

Extraction of Lithium Phosphate

Lithium ions in a concentration of 0.917 g/L were dissolved in a filtered solution remaining after removing impurities of Mg, Ca, and B from the brine, and sodium phosphate in a concentration of 7.217 g/L was added thereto. The mixture was heated up to 90° C. and then maintained at the same temperature and reacted for 15 to 60 minutes.

When the reaction was complete, lithium phosphate precipitated during the reaction was filtered and separated. The remaining solution was measured regarding lithium concentration. The results are provided in FIG. 10.

As shown in FIG. 10, when the sodium phosphate was initially added to the brine, the lithium concentration sharply decreased in the filtered solution. After reaction time of 15 minutes, the lithium concentration in the filtered solution decreased down to less than 50 mg/L, which shows greater than or equal to 95% of lithium dissolved in the brine was precipitated into lithium phosphate and separated.

In other words, since the lithium phosphate had lower solubility of about 0.39 g/L than that of the lithium carbonate, a small amount of lithium dissolved in the brine was easily precipitated into lithium phosphate in a solid state by adding a phosphoric acid-containing material such as sodium phosphate and the like to the brine.

In addition, as shown in FIG. 11, when the heating was performed at a temperature of greater than or equal to 90° C., lithium was recovered at a rate of greater than or equal to 90% to the reaction time of 10 minutes, and then at a rate of greater than or equal to 95% at the reaction time of 15 minutes.

EXAMPLE 6

Preparation of Lithium Hydroxide 55.6 g of lithium phosphate was added to 1 L of distilled water heated up to 90° C. The mixture was agitated for 30 minutes. Then, 59.27 g of calcium hydroxide corresponding to 1 equivalent of the added lithium phosphate was added thereto.

Herein, the lithium phosphate had a particle diameter of 13 μm and a specific surface area of 54 $m^2/g$.

Then, a slurry including the lithium phosphate and the calcium hydroxide was filtered depending on reaction time. The filtered solution was measured regarding lithium concentration. The results are provided in FIG. 12.

As shown in FIG. 12, the lithium concentration in the filtered solution was 4.27 g/L after 2 hours, and gradually increased as time passed and reached 6.4 g/L at 10 hours. In other words, lithium was eluted from the lithium phosphate. Comparative Example 1 was provided for comparison.

Herein, the pH of the solution was 10.5 after 2 hours, and then gradually increased as time passed and reached 11.0 after 10 hours. Accordingly, the solution turned out to be a LiOH aqueous solution.

500 mL of a 6.4 g/L LiOH solution was heated to evaporate water therein and concentrate its volume down to half, and then $CO_2(g)$ was injected thereinto at a rate of 0.5 L/min.

Herein, lithium carbonate was precipitated. The XRD analysis results of the lithium carbonate precipitate are shown in FIG. 13. In addition, the amount of main impurities is provided in the following Table 2.

TABLE 2

| Purities of lithium carbonate | Content of impurities (%) | | | | | | |
|---|---|---|---|---|---|---|---|
| (%) | Na | K | Mg | Ca | B | Cl | $SO_4$ |
| 99.9 | 0.05 | <0.0001 | 0.0002 | 0.0018 | 0.0007 | <0.001 | <0.001 |

COMPARATIVE EXAMPLE 1

27.8 g of lithium phosphate was added to 1 L of distilled water heated to 90° C., and then the mixture was agitated. The obtained lithium phosphate slurry was filtered depending on the reaction time. The filtered solution was measured regarding lithium concentration, and the results are provided in FIG. 2.

As shown in FIG. 2, the lithium concentration was 0.062 g/L after 2 hours and was constantly maintained at almost the same lithium concentration for up to 10 hours.

In other words, the lithium phosphate turned out to be a very stable compound in an aqueous solution, that is, a sparingly-soluble material.

COMPARATIVE EXAMPLE 2

Mg, Ca, and B impurities were removed from brine. The remaining solution included lithium ions dissolved in a concentration of 0.917 g/L in a remaining solution, and carbonate sodium in a concentration of 7 g/L was added thereto. The mixture was heated up to 90° C. and maintained and reacted at the same temperature for 15 to 60 minutes.

When the reaction was complete, lithium carbonate was precipitated and separated. The remaining solution was measured regarding lithium concentration. The results are provided in FIG. 8.

As shown in FIG. 14, even though the carbonate sodium was added to a lithium-containing solution and reacted therewith for 15 to 60 minutes, the lithium concentration in the filtered solution was almost the same as the one in the brine before the reaction.

In other words, the lithium carbonate had higher solubility of about 13 g/L and thus was very dissolved in water. Accordingly, the small amount of lithium dissolved in the brine might be precipitated into lithium carbonate by evaporating and concentrating the brine to largely increase the precipitated amount of the lithium carbonate. However, the evaporation and concentration of the brine required a lot of of energy and time, and deteriorated productivity and decreased the lithium recovery rate.

The present invention economically extracts lithium at a high recovery rate by precipitating lithium dissolved in brine using lithium phosphate having low solubility without evaporation and concentration of the brine over a long period of time.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1: storage tank
2: carbonation reaction tank
3: droplet spray unit
4: high-pressure pump
5: droplet spray nozzle
6: carbonation gas storage tank
7: carbonation gas supplying unit
8: pressure measuring unit
9: carbonation gas supply valve
10: pressure control valve
11: safety valve
12: pH measuring unit
13: alkali solution input pump
14: alkali solution input nozzle
15: slurry agitating unit
16: level measuring unit
17: rotary dump valve
18: vacuum valve

The invention claimed is:

1. A method for extraction of lithium from a solution including lithium, comprising:
    separating a solution including lithium into a monovalent ion-containing solution and a solution including ions having divalence or more using a separation membrane having a negative charge on its surface;
    removing impurities from the monovalent ion-containing solution; and
    adding a phosphorus supplying material to the monovalent ion-containing solution where impurities are removed and then precipitating dissolved lithium into lithium phosphate,
    wherein the separation membrane comprises a coating having a sulfone group that is coated onto a polyamide substrate, wherein the sulfone group provides the negative charge.

2. The method for extraction of lithium from a solution including lithium of claim 1, wherein a pore size of the separation membrane having a negative charge on its surface ranges from 0.5 to 1 nm.

3. The method for extraction of lithium from a solution including lithium of claim 1, wherein a thickness of the separation membrane having a negative charge on its surface ranges from 0.5 to 1.5 μm.

4. The method for extraction of lithium from a solution including lithium of claim 1, wherein in the process of removing impurities from the monovalent ion-containing solution, the impurities are non-separated ions having divalence or more.

5. The method for extraction of lithium from a solution including lithium of claim 1, wherein in a process of removing impurities from the monovalent ion-containing solution,
    the impurities comprise magnesium, boron, or calcium.

6. The method for extraction of lithium from a solution including lithium of claim 1, wherein the solution including lithium is brine.

7. The method for extraction of lithium from a solution including lithium of claim 1, wherein the method further comprises evaporating the monovalent ion-containing solution from which impurities are removed and then extracting sodium chloride after the process of removing impurities from the monovalent ion-containing solution.

8. The method for extraction of lithium from a solution including lithium of claim 1, wherein the method further comprises evaporating the monovalent ion-containing solution from which impurities are removed after the process of removing impurities from the monovalent ion-containing solution.

9. The method for extraction of lithium from a solution including lithium of claim 5, wherein the process of removing impurities from the monovalent ion-containing solution is a process of adding hydroxide anions to the monovalent ion-containing solution and precipitating and removing impurities including magnesium, boron, or calcium included in the monovalent ion-containing solution.

10. The method for extraction of lithium from a solution including lithium of claim 9, wherein the process of removing impurities from the monovalent ion-containing solution comprises
    adding hydroxide anions to the monovalent ion-containing solution and then producing magnesium hydroxide from the magnesium, and
    maintaining pH of a filtered solution obtained after removing the magnesium to be greater than or equal to 12 and then precipitating calcium.

11. The method for extraction of lithium from a solution including lithium of claim 10, wherein the process of removing impurities in the monovalent ion-containing solution comprises:
    adding hydroxide anions to the monovalent ion-containing solution and then producing magnesium hydroxide from the magnesium while maintaining pH of the monovalent ion-containing solution to be 8.5 to 10.5;
    adsorbing boron on the magnesium hydroxide, co-precipitating the magnesium and boron, and recovering the co-precipitated magnesium and boron; and maintaining pH of a filtered solution obtained after removing the magnesium and boron to be greater than or equal to 12 and then precipitating calcium.

12. The method for extraction of lithium from a solution including lithium of claim 5, wherein the process of removing impurities from the monovalent ion-containing solution comprises
a process of reacting calcium in the monovalent ion-containing solution with a carbonation gas and removing it in a form of a calcium carbonate salt.

13. The method for extraction of lithium from a solution including lithium of claim 12, wherein the process of reacting calcium in the monovalent ion-containing solution with a carbonation gas and removing it in a form of a calcium carbonate salt is performed at pH 5 to 8.5.

14. The method for extraction of lithium from a solution including lithium of claim 12, wherein the method further comprises reacting magnesium in the monovalent ion-containing solution with a carbonation gas to remove it in a form of a magnesium carbonate salt after the process of reacting calcium in the monovalent ion-containing solution with a carbonation gas and removing it in a form of a calcium carbonate salt.

15. The method for extraction of lithium from a solution including lithium of claim 14, wherein the process of reacting magnesium in the monovalent ion-containing solution with a carbonation gas to remove it in a form of a magnesium carbonate salt is performed at pH 5 to 12.

16. The method for extraction of lithium from a solution including lithium of claim 14, wherein reacting calcium in the monovalent ion-containing solution with a carbonation gas to separate it in a form of a calcium carbonate salt, or reacting magnesium in the monovalent ion-containing solution with a carbonation gas to remove it in a form of a magnesium carbonate salt, comprises
a process of spraying brine into the carbonation reaction tank through a droplet spray unit of a carbonation reaction tank charged with a carbonation gas at a predetermined pressure, in a form of droplets.

17. The method for extraction of lithium from a solution including lithium of claim 16, wherein the carbonation reaction tank is further equipped with an alkali solution supplying unit to control pH.

* * * * *